(12) United States Patent
Vitale et al.

(10) Patent No.: US 12,713,122 B2
(45) Date of Patent: Aug. 18, 2026

(54) CONNECTOR MODULE TO CONNECT IMAGE SENSORS AND LENS ASSEMBLIES WITHIN AN IMAGE CAPTURE APPARATUS

(71) Applicant: GoPro, Inc., San Mateo, CA (US)

(72) Inventors: Nicholas Vitale, Foster City, CA (US); David Thomas Platner, San Francisco, CA (US); Adrian Santos, Lake Forest, CA (US)

(73) Assignee: GoPro, Inc., San Mateo, CA (US)

( * ) Notice: Subject to any disclaimer, the term of this patent is extended or adjusted under 35 U.S.C. 154(b) by 141 days.

(21) Appl. No.: 18/924,004

(22) Filed: Oct. 23, 2024

(65) Prior Publication Data

US 2025/0142195 A1 May 1, 2025

Related U.S. Application Data

(60) Provisional application No. 63/546,000, filed on Oct. 27, 2023.

(51) Int. Cl.

| | |
|---|---|
| ***H04N 23/55*** | (2023.01) |
| ***G03B 17/08*** | (2021.01) |
| ***G03B 17/12*** | (2021.01) |
| ***H04N 23/51*** | (2023.01) |
| ***H04N 23/54*** | (2023.01) |

(52) U.S. Cl.

CPC ............. *H04N 23/55* (2023.01); *G03B 17/08* (2013.01); *G03B 17/12* (2013.01); *H04N 23/51* (2023.01); *H04N 23/54* (2023.01)

(58) Field of Classification Search

None

See application file for complete search history.

(56) References Cited

U.S. PATENT DOCUMENTS

| | | | |
|---|---|---|---|
| 751,347 | A | 2/1904 | Scheimpflug |
| 3,760,704 | A | 9/1973 | Baker |
| 3,818,498 | A | 6/1974 | Zehnpfennig |
| 4,109,263 | A | 8/1978 | Johnson |
| 4,119,980 | A | 10/1978 | Baker |
| 5,721,585 | A | 2/1998 | Keast |
| D467,259 | S | 12/2002 | Hung |
| 6,726,331 | B2 | 4/2004 | Miyata |
| 8,149,327 | B2 | 4/2012 | Lin |

(Continued)

OTHER PUBLICATIONS

Randall Hand, "Immersive Media's Dodeca 2360 Spherical Video Camera", VizWorld, Nov. 12, 2025, 4 pages.

(Continued)

*Primary Examiner* — Twyler L Haskins
*Assistant Examiner* — Wesley J Chiu
(74) *Attorney, Agent, or Firm* — Young Basile Hanlon & MacFarlane, P.C.

(57) ABSTRACT

An image capture apparatus with a first image sensor and lens assembly (first ISLA), a second image sensor and lens assembly (second ISLA); a connector module, and a front connector. The connector module connects the first ISLA and the second ISLA are in a back-to-back configuration. The front connector is connected to the connector module via fasteners that extend into the front connector and the connector module in a direction from the first ISLA towards the second ISLA so that the first ISLA and the second ISLA are connected within the image capture device.

16 Claims, 12 Drawing Sheets

(56) References Cited

U.S. PATENT DOCUMENTS

| | | | | |
|---|---|---|---|---|
| 9,185,279 | B2 | 11/2015 | Masuda | |
| 9,456,113 | B2 | 9/2016 | Masuda | |
| 9,554,041 | B1 * | 1/2017 | Shin | H04N 23/90 |
| 9,607,358 | B2 | 3/2017 | Takenaka | |
| 9,736,372 | B2 | 8/2017 | Masuda | |
| 9,992,414 | B2 | 6/2018 | Masuda | |
| 10,382,681 | B2 | 8/2019 | Masuda | |
| 10,404,912 | B2 | 9/2019 | Ogawa | |
| 10,652,458 | B2 | 5/2020 | Kang | |
| 10,666,360 | B2 | 5/2020 | Saathoff | |
| 10,666,860 | B2 | 5/2020 | Takenaka | |
| 10,855,919 | B2 | 12/2020 | Masuda | |
| 10,855,979 | B2 | 12/2020 | Pace | |
| 2002/0057337 | A1 | 5/2002 | Kumler | |
| 2007/0002131 | A1 | 1/2007 | Ritchey | |
| 2007/0062905 | A1 | 3/2007 | Hung | |
| 2009/0040291 | A1 | 2/2009 | Mccall | |
| 2010/0045773 | A1 | 2/2010 | Ritchey | |
| 2012/0023177 | A1 | 1/2012 | Linden | |
| 2014/0192144 | A1 | 7/2014 | St. Clair | |
| 2014/0218587 | A1 | 8/2014 | Shah | |
| 2017/0054907 | A1 | 2/2017 | Nishihara | |
| 2018/0262682 | A1 * | 9/2018 | Wang | H04N 23/698 |
| 2019/0052785 | A1 * | 2/2019 | Ai | H04N 23/58 |
| 2020/0120250 | A1 * | 4/2020 | Colin | H05K 7/20145 |
| 2020/0162670 | A1 * | 5/2020 | Ichikawa | H04N 5/265 |
| 2020/0348481 | A1 * | 11/2020 | Toriumi | G02B 7/02 |
| 2021/0067675 | A1 * | 3/2021 | Yang | H04N 23/55 |
| 2024/0345460 | A1 * | 10/2024 | Platner | H04N 23/55 |

OTHER PUBLICATIONS

The Magazine of Panoramic Imaging, Jun.-Jul. 1996, vol. 13, No. 3, 20 pages.

The Magazine of Panoramic Imaging, Mar.-Apr. 1996, vol. 13, No. 2, 20 pages.

* cited by examiner

CONNECTOR MODULE TO CONNECT IMAGE SENSORS AND LENS ASSEMBLIES WITHIN AN IMAGE CAPTURE APPARATUS

CROSS-REFERENCE TO RELATED APPLICATION(S)

This application claims priority to and the benefit of U.S. Provisional Patent Application Ser. No. 63/546,000, filed Oct. 27, 2023, the entire disclosure of which is hereby incorporated by reference.

TECHNICAL FIELD

This disclosure relates to an image module with one or more image sensor and lens assemblies (ISLAs) that are electrically connected to the camera using a connector module (e.g., a lens mount, a retention system).

BACKGROUND

Image capture devices have been created with one image sensor that captures images from a direction facing the image sensor. Some image capture devices may include more than one image sensor that capture images in more than one direction. These multiple image sensors may detect image data used to generate composite images of an environment around the image capture device, such as omnidirectional images. These image sensors may be located on opposing sides of the image capture device and detected images may be combined, such as by stitching, to form a single image.

SUMMARY

Disclosed herein are implementations of an image capture device including: a first lens assembly, a first image sensor, a second lens assembly, and a second image sensor. The first lens assembly has a first area. The first image sensor in communication with the first lens assembly forms a first image sensor and lens assembly (a first ISLA), the first ISLA facing in a first direction. A first connector is located on the first image sensor and extends outside of the first area. A flexible member comprising a flexible connector aligns with the first connector so that a connection is formed between the first connector and the flexible member to connect the first ISLA within the image capture device.

The second lens assembly has a second area. The second image sensor is in communication with the second lens assembly forming a second image sensor and lens assembly (a second ISLA), the second ISLA facing in a second direction that is opposite the first direction. A second connector located on the second image sensor that extends outside of the second area. A second flexible member comprising a second flexible connector that aligns with the second connector so that a connection is formed between the second connector and the second flexible connector to connect the second ISLA to the image capture device.

A connector module connects the first ISLA and the second ISLA together. A first retention system extends around the first connector of the first image sensor. A second retention system that extends around the second connector of the second image sensor.

The first ISLA is connected to a body of the image capture apparatus. The first ISLA is connected to a bayonet via fasteners. A second ISLA may be free of a direct connection with the image puncture apparatus or a bayonet. The first ISLA and the second ISLA may be connected together by a connector module. The connector module may connect the first ISLA and the second ISLA so that the second ISLA is axially assigned within the image capture apparatus without a direct connection to the body of the image capture apparatus. The first ISLA and the second ISLA have a cantilevered connection via the connection of the first ISLA with the image capture apparatus.

The first ISLA and the second ISLA may include seals that extend between the first ISLA and a first bayonet, and seals that extend between the second ISLA and the second bayonet. The first ISLA may be covered by a front removable outer lens. The second ISLA may be covered by a second removable outer lens. The first ISLA may be waterproof when the front removable outer lens is located over the first ISLA and when the front removable outer lens is removed. The second ISLA may be waterproof when the rear removable outer lens is located over the second ISLA and when the rear removable outer lens is removed.

The present teachings provide: an image capture apparatus with a first image sensor and lens assembly (first ISLA), a second image sensor and lens assembly (second ISLA); a connector module, and a front connector. The connector module connects the first ISLA and the second ISLA are in back-to-back configuration. The front connector is connected to the connector module via fasteners that extend into the front connector and the connector module a direction from the first ISLA towards the second ISLA so that the first ISLA and the second ISLA are connected within the image capture device.

The present teachings provide: an image capture apparatus with a housing, a first image sensor and lens assembly (first ISLA); and a second image sensor and lens assembly (second ISLA). A front connector (bayonet) is in communication with the first ISLA. Aa connector module connects the first ISLA and the second ISLA are back-to-back. A rear connector (bayonet) is connected to the image capture apparatus. A front seal is located between the front connector and the connector module. A rear seal is located between the rear connector and the connector module. A front removable outer lens is connected to the front connector. A rear removable outer lens is connected to the rear connector. The image capture apparatus is waterproof and/or debris proof when the front removable outer lens, the rear removable outer lens, or both are connected to the image capture apparatus. The image capture apparatus is waterproof and/or debris proof when the front removable outer lens, the rear removable outer lens, or both are removed.

The present teachings provide: an image capture apparatus with a connector module a front ISLA, a rear ISLA, a front connector, and a forward lens mount seal. The connector module has a forward connector module with a forward aperture and a rearward connector module with a rearward aperture. The front image sensor and lens assembly (front ISLA) is located within and connected to the forward aperture. The rear image sensor and lens assembly (rear ISLA) is located within and connected to the rearward aperture. The front connector is directly connected to the forward connector. The forward lens mount seal is located between the forward connector module and the front connector. The rearward connector module is connected to the forward connector module and is free of any other connections to retain the rearward connector module within the image capture apparatus.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
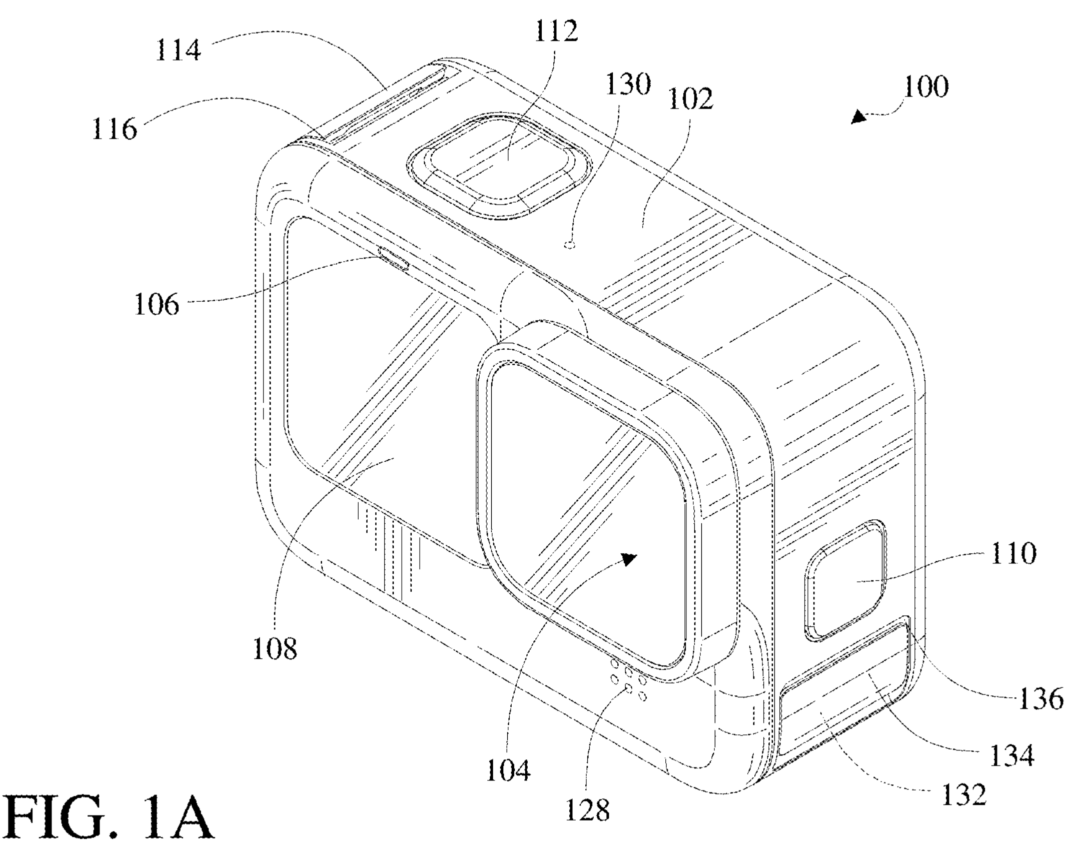
FIGS. 1A-1B are isometric views of an example of an image capture apparatus.

The present teachings relate to an image capture apparatus. The image capture apparatus includes two back-to-back image sensor and lens assemblies (ISLAs). The ISLAs are aligned along an optical axis. The ISLAs are connected to one another. A first ISLA is connected to a mounting structure, a wall, the housing, or a combination thereof. The first ISLA extends from a forward side of the image capture apparatus toward a rearward side of the image capture apparatus. The first ISLA is connected to a second ISLA (e.g., a rear ISLA).

The second ISLA may be connected to the first ISLA by a connector module. The second ISLA may be free of any connection (i.e., a direct connection) with a mounting structure, a wall, the housing, or a combination thereof. The second ISLA may only be supported by a connection with the first ISLA. The second ISLA may extend cantilevered from the first ISLA, a connection module housing the first ISLA, or both. The second ISLA may be connected to a same portion of the connector module as the first ISLA.

The connector module may be two or more pieces. The connector module may include a forward connector module (e.g., a first connector module) and a rearward connector module (e.g., a second connector module). The forward connector module may connect to a forward mounting structure (e.g., a bayonet). The forward connector module and the forward mounting structure may directly connect, connect without any intervening items, or both. A wall or a housing may be located between the forward connector module and the forward mounting structure. The forward connector module may connect to a rearward connector module.

The rearward connector module may be free of direct contact with any structure other than the forward connector module. The rearward connector module may be connected to the forward connector module so that the rearward connector is supported. The connection may be formed by fasteners, clips, pins, bolts, a tongue, or a combination thereof. The forward connector module and the rearward connector module may receive all or a portion of an ISLA.

The forward connector module and the rearward connector module include one or more apertures and one or more connection features. The apertures receive all or a portion of an ISLA. Lenses of the lens assembly may extend within the apertures. A sensor may be located at a rear end of the aperture. The sensor may be connected to an end of the aperture. A series of lenses may be contained and may removably extend into the aperture. The ISLA may be a two-part ISLA with first part being connected to a rear end of the connector module and a second part extending into the aperture from the forward end. The aperture may include connection features that permit all or a portion of an ISLA to connect to the connector modules.

The connection features may be any feature that allows all or a portion of an ISLA to be removably connected to the connector module. The connection features may be threads, detents, a friction fit, a taper, or a combination thereof. The connector module may be in communication with one or more seals.

The seals may be connected to, in communication with, extend around, or a combination thereof mounting structure, connector modules, fasteners an outer lens, connection devices, or a combination thereof. The seals may be compressible. The seals may be or include rubber, an elastomer, a polymer, nylon, or a combination thereof.

Figure 1B:
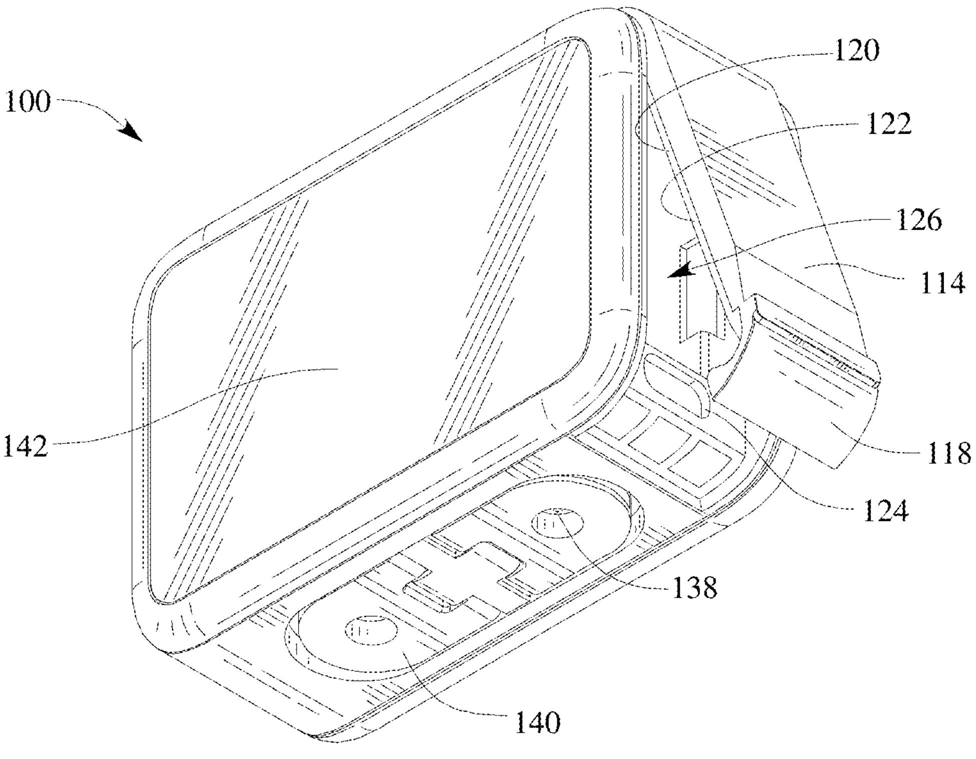
Figure 5:
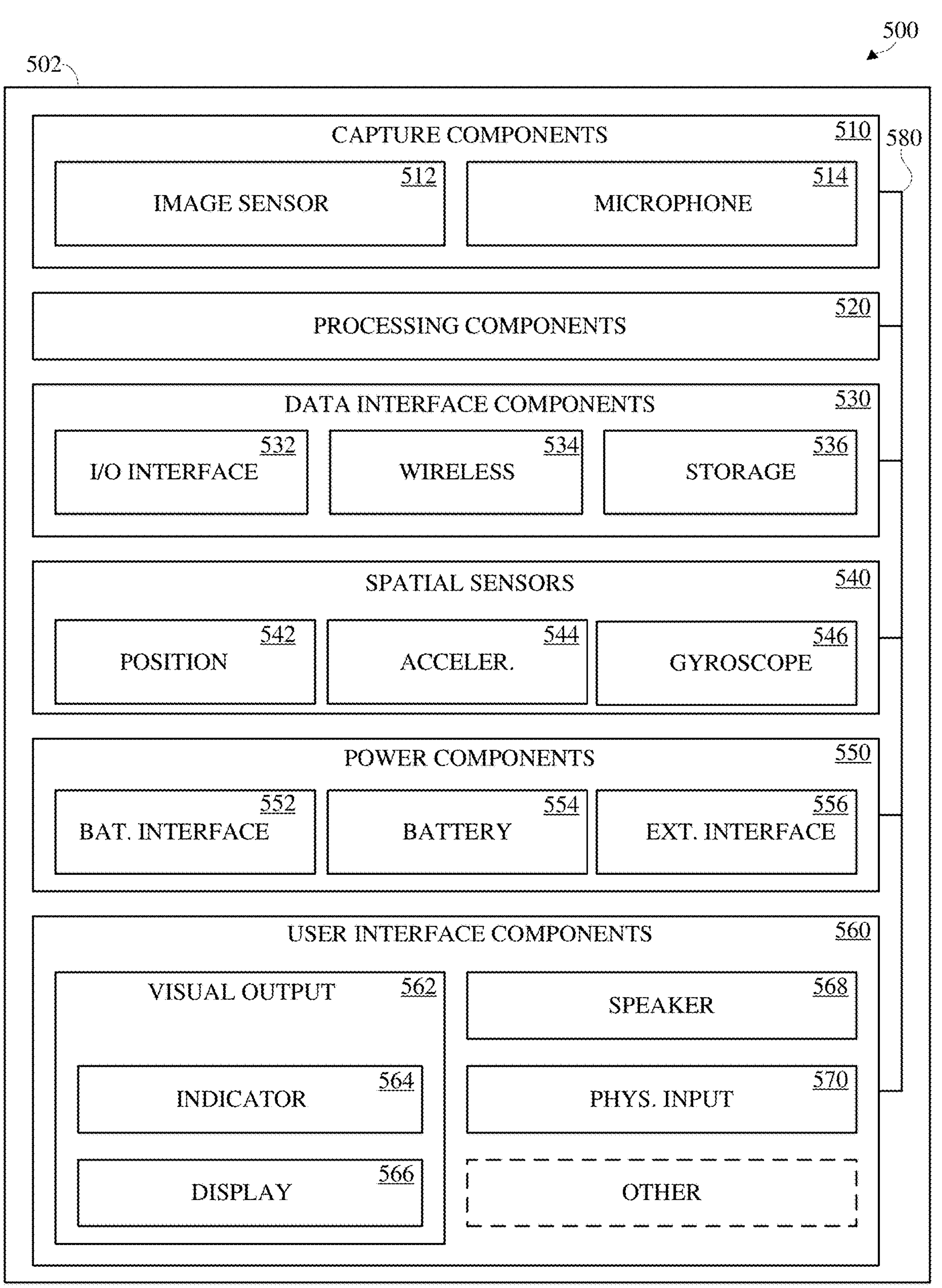
FIG. 5 is a block diagram of electronic components of an image capture apparatus.

FIGS. 1A-1B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS. 1A-1B, the image capture apparatus 100 includes internal electronics, such as imaging electronics, power electronics, and the like, internal to the body 102 for capturing images and performing other functions of the image capture apparatus 100. An example showing internal electronics is shown in FIG. 5. The arrangement of the components of the image capture apparatus 100 shown in FIGS. 1A-1B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used. The image capture device 104 is structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. In some implementations, the display 108 may be omitted or combined with another component of the image capture apparatus 100.

As shown in FIG. 1A, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1A, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. The shutter button 112 may be another type of input device, such as a switch, a toggle, a slider, or a dial. The image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1B, the image capture apparatus 100 includes the door 114 coupled to the body 102, such as using the hinge mechanism 116 (FIG. 1A). The door 114 may be secured to the body 102 using the latch mechanism 118 that releasably engages the body 102 at a position generally opposite the hinge mechanism 116. The door 114 includes the seal 120 and the battery interface 122. Although one door 114 is shown in FIG. 1A, the image capture apparatus 100 may include multiple doors respectively forming respective surfaces of the body 102, or portions thereof. The door 114 may be removable from the body 102 by releasing the latch mechanism 118 from the body 102 and decoupling the hinge mechanism 116 from the body 102.

In FIG. 1B, the door 114 is shown in a partially open position such that the data interface 124 is accessible for communicating with external devices and the battery receptacle 126 is accessible for placement or replacement of a battery. In FIG. 1A, the door 114 is shown in a closed position. In implementations in which the door 114 is in the closed position, the seal 120 engages a flange (not shown) to provide an environmental seal and the battery interface 122 engages the battery (not shown) to secure the battery in the battery receptacle 126.

As shown in FIG. 1B, the image capture apparatus 100 includes the battery receptacle 126 structured to form a portion of an interior surface of the body 102. The battery receptacle 126 includes operative connections for power transfer between the battery and the image capture apparatus 100. In some implementations, the battery receptacle 126 may be omitted. The image capture apparatus 100 may include multiple battery receptacles.

As shown in FIG. 1A, the image capture apparatus 100 includes a first microphone 128 structured on a front surface of the body 102, a second microphone 130 structured on a top surface of the body 102, and a third microphone 132 structured on a side surface of the body 102. The third microphone 132, which may be referred to as a drain microphone and is indicated as hidden in dotted line, is located behind a drain cover 134, surrounded by a drain channel 136, and can drain liquid from audio components of the image capture apparatus 100. The image capture apparatus 100 may include other microphones on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 138 structured on a bottom surface of the body 102. The speaker 138 outputs or presents audio, such as by playing back recorded audio or emitting sounds associated with notifications. The image capture apparatus 100 may include multiple speakers structured on respective surfaces of the body 102.

As shown in FIG. 1B, the image capture apparatus 100 includes the interconnect mechanism 140 structured on a bottom surface of the body 102. The interconnect mechanism 140 removably connects the image capture apparatus 100 to an external structure, such as a handle grip, another mount, or a securing device. The interconnect mechanism 140 includes folding protrusions configured to move between a nested or collapsed position as shown in FIG. 1B and an extended or open position. The folding protrusions of the interconnect mechanism 140 in the extended or open position may be coupled to reciprocal protrusions of other devices such as handle grips, mounts, clips, or like devices. The image capture apparatus 100 may include multiple interconnect mechanisms structured on, or forming a portion of, respective surfaces of the body 102. In some implementations, the interconnect mechanism 140 may be omitted.

As shown in FIG. 1B, the image capture apparatus 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture apparatus 100. The image capture apparatus 100 may include multiple displays structured on respective surfaces of the body 102, such as the displays 108, 142 shown in FIGS. 1A-1B. In some implementations, the display 142 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100. For example, the image capture apparatus 100 may communicate with an external device, such as an external user interface device, via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link.

The external device may store, process, display, or combination thereof, the images. The external user interface device may be a computing device, such as a smartphone, a tablet computer, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
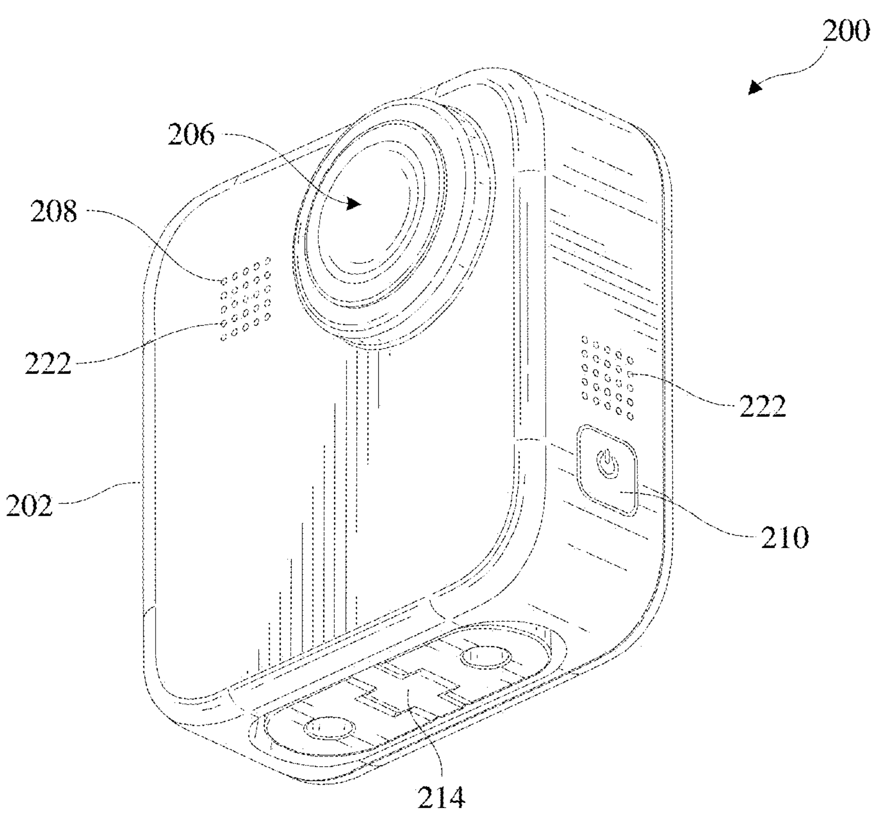
FIGS. 2A-2B are isometric views of another example of an image capture apparatus.
Figure 2B:
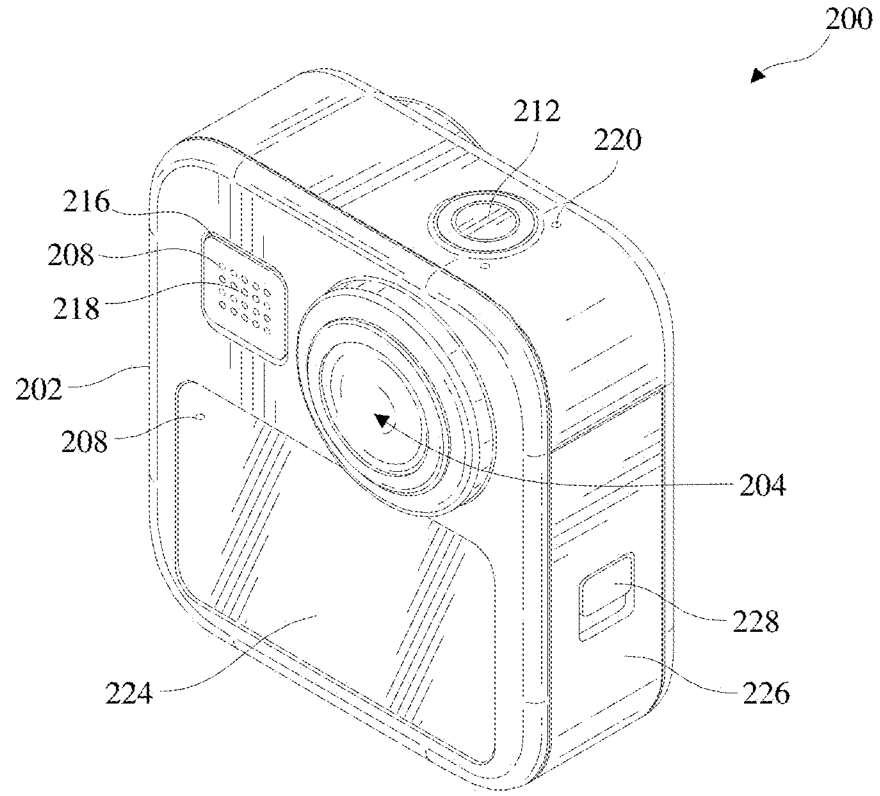

FIGS. 2A-2B illustrate another example of an image capture apparatus 200. The image capture apparatus 200 is similar to the image capture apparatus 100 shown in FIGS. 1A-1B. The image capture apparatus 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used.

The body 202 of the image capture apparatus 200 may be similar to the body 102 shown in FIGS. 1A-1B. The first image capture device 204 is structured on a front surface of the body 202. The first image capture device 204 includes a first lens. The first image capture device 204 may be similar to the image capture device 104 shown in FIG. 1A. As shown in FIG. 2A, the image capture apparatus 200 includes the second image capture device 206 structured on a rear surface of the body 202. The second image capture device 206 includes a second lens. The second image capture device 206 may be similar to the image capture device 104 shown in FIG. 1A. The image capture devices 204, 206 are disposed on opposing surfaces of the body 202, for example, in a back-to-back configuration, Janus configuration, or offset Janus configuration. The image capture apparatus 200 may include other image capture devices structured on respective surfaces of the body 202.

As shown in FIG. 2B, the image capture apparatus 200 includes the indicators 208 associated with the audio component 218 and the display 224 on the front surface of the body 202. The indicators 208 may be similar to the indicator 106 shown in FIG. 1A. For example, one of the indicators 208 may indicate a status of the first image capture device 204 and another one of the indicators 208 may indicate a status of the second image capture device 206. Although two indicators 208 are shown in FIGS. 2A-2B, the image capture apparatus 200 may include other indictors structured on respective surfaces of the body 202.

As shown in FIGS. 2A-2B, the image capture apparatus 200 includes input mechanisms including the mode button 210, structured on a side surface of the body 202, and the shutter button 212, structured on a top surface of the body 202. The mode button 210 may be similar to the mode button 110 shown in FIG. 1B. The shutter button 212 may be similar to the shutter button 112 shown in FIG. 1A.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 5.

As shown in FIGS. 2A-2B, the image capture apparatus 200 includes the interconnect mechanism 214 structured on a bottom surface of the body 202. The interconnect mechanism 214 may be similar to the interconnect mechanism 140 shown in FIG. 1B.

As shown in FIG. 2B, the image capture apparatus 200 includes the drainage channel 216 for draining liquid from audio components of the image capture apparatus 200.

As shown in FIGS. 2A-2B, the image capture apparatus 200 includes the audio components 218, 220, 222, respectively structured on respective surfaces of the body 202. The audio components 218, 220, 222 may be similar to the microphones 128, 130, 132 and the speaker 138 shown in FIGS. 1A-1B. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts.

As shown in FIGS. 2A-2B, a first audio component 218 is located on a front surface of the body 202, a second audio component 220 is located on a top surface of the body 202, and a third audio component 222 is located on a back surface of the body 202. Other numbers and configurations for the audio components 218, 220, 222 may be used. For example, the audio component 218 may be a drain microphone surrounded by the drainage channel 216 and adjacent to one of the indicators 208 as shown in FIG. 2B.

As shown in FIG. 2B, the image capture apparatus 200 includes the display 224 structured on a front surface of the body 202. The display 224 may be similar to the displays 108, 142 shown in FIGS. 1A-1B. The display 224 may include an I/O interface. The display 224 may include one or more of the indicators 208. The display 224 may receive touch inputs. The display 224 may display image information during video capture. The display 224 may provide status information to a user, such as status information indicating battery power level, memory card capacity, time elapsed for a recorded video, etc. The image capture apparatus 200 may include multiple displays structured on respective surfaces of the body 202. In some implementations, the display 224 may be omitted or combined with another component of the image capture apparatus 200.

As shown in FIG. 2B, the image capture apparatus 200 includes the door 226 structured on, or forming a portion of, the side surface of the body 202. The door 226 may be similar to the door 114 shown in FIG. 1A. For example, the door 226 shown in FIG. 2A includes a release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O interface, a memory card interface, etc.

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

Figure 3:
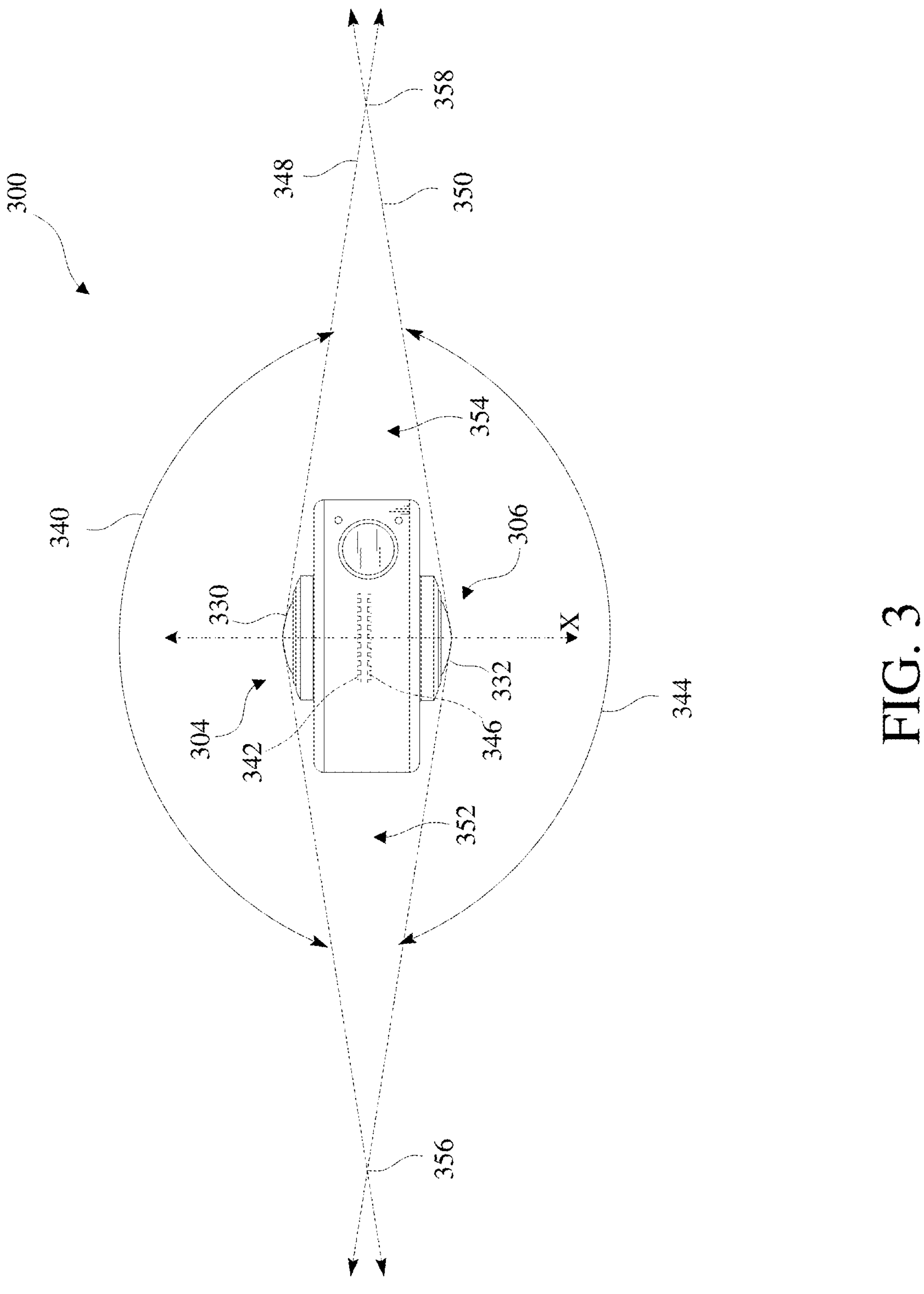
FIG. 3 is a top view of another example of an image capture apparatus.

FIG. 3 is a top view of an image capture apparatus 300. The image capture apparatus 300 is similar to the image capture apparatus 200 of FIGS. 2A-2B and is configured to capture spherical images.

As shown in FIG. 3, a first image capture device 304 includes a first lens 330 and a second image capture device 306 includes a second lens 332. For example, the first image capture device 304 may capture a first image, such as a first hemispheric, or hyper-hemispherical, image, the second image capture device 306 may capture a second image, such as a second hemispheric, or hyper-hemispherical, image, and the image capture apparatus 300 may generate a spherical image incorporating or combining the first image and the second image, which may be captured concurrently, or substantially concurrently.

The first image capture device 304 defines a first field-of-view 340 wherein the first lens 330 of the first image capture device 304 receives light. The first lens 330 directs the received light corresponding to the first field-of-view 340 onto a first image sensor 342 of the first image capture device 304. For example, the first image capture device 304 may include a first lens barrel (not expressly shown), extending from the first lens 330 to the first image sensor 342.

The second image capture device 306 defines a second field-of-view 344 wherein the second lens 332 receives light. The second lens 332 directs the received light corresponding to the second field-of-view 344 onto a second image sensor 346 of the second image capture device 306. For example, the second image capture device 306 may include a second lens barrel (not expressly shown), extending from the second lens 332 to the second image sensor 346.

A boundary 348 of the first field-of-view 340 is shown using broken directional lines. A boundary 350 of the second field-of-view 344 is shown using broken directional lines. As shown, the image capture devices 304, 306 are arranged in a back-to-back (Janus) configuration such that the lenses 330, 332 face in opposite directions, and such that the image capture apparatus 300 may capture spherical images. The first image sensor 342 captures a first hyper-hemispherical image plane from light entering the first lens 330. The second image sensor 346 captures a second hyper-hemispherical image plane from light entering the second lens 332.

As shown in FIG. 3, the fields-of-view 340, 344 partially overlap such that the combination of the fields-of-view 340, 344 forms a spherical field-of-view, except that one or more uncaptured areas 352, 354 may be outside of the fields-of-view 340, 344 of the lenses 330, 332. Light emanating from or passing through the uncaptured areas 352, 354, which may be proximal to the image capture apparatus 300, may be obscured from the lenses 330, 332 and the corresponding image sensors 342, 346, such that content corresponding to the uncaptured areas 352, 354 may be omitted from images captured by the image capture apparatus 300. In some implementations, the image capture devices 304, 306, or the lenses 330, 332 thereof, may be configured to minimize the uncaptured areas 352, 354.

Examples of points of transition, or overlap points, from the uncaptured areas 352, 354 to the overlapping portions of the fields-of-view 340, 344 are shown at 356, 358.

Images contemporaneously captured by the respective image sensors 342, 346 may be combined to form a combined image, such as a spherical image. Generating a combined image may include correlating the overlapping regions captured by the respective image sensors 342, 346, aligning the captured fields-of-view 340, 344, and stitching the images together to form a cohesive combined image. Stitching the images together may include correlating the overlap points 356, 358 with respective locations in corresponding images captured by the image sensors 342, 346. Although a planar view of the fields-of-view 340, 344 is shown in FIG. 3, the fields-of-view 340, 344 are hyper-hemispherical.

A change in the alignment, such as position, tilt, or a combination thereof, of the image capture devices 304, 306, such as of the lenses 330, 332, the image sensors 342, 346, or both, may change the relative positions of the respective fields-of-view 340, 344, may change the locations of the overlap points 356, 358, such as with respect to images captured by the image sensors 342, 346, and may change the uncaptured areas 352, 354, which may include changing the uncaptured areas 352, 354 unequally.

Incomplete or inaccurate information indicating the alignment of the image capture devices 304, 306, such as the locations of the overlap points 356, 358, may decrease the accuracy, efficiency, or both of generating a combined image. In some implementations, the image capture apparatus 300 may maintain information indicating the location and orientation of the image capture devices 304, 306, such as of the lenses 330, 332, the image sensors 342, 346, or both, such that the fields-of-view 340, 344, the overlap points 356, 358, or both may be accurately determined, which may improve the accuracy, efficiency, or both of generating a combined image.

The lenses 330, 332 may be aligned along an axis X as shown, laterally offset from each other (not shown), off-center from a central axis of the image capture apparatus 300 (not shown), or laterally offset and off-center from the central axis (not shown). Whether through use of offset or through use of compact image capture devices 304, 306, a reduction in distance between the lenses 330, 332 along the axis X may improve the overlap in the fields-of-view 340, 344, such as by reducing the uncaptured areas 352, 354.

Images or frames captured by the image capture devices 304, 306 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 356, 358, may be matched accurately to minimize boundary discontinuities.

Figure 4A:
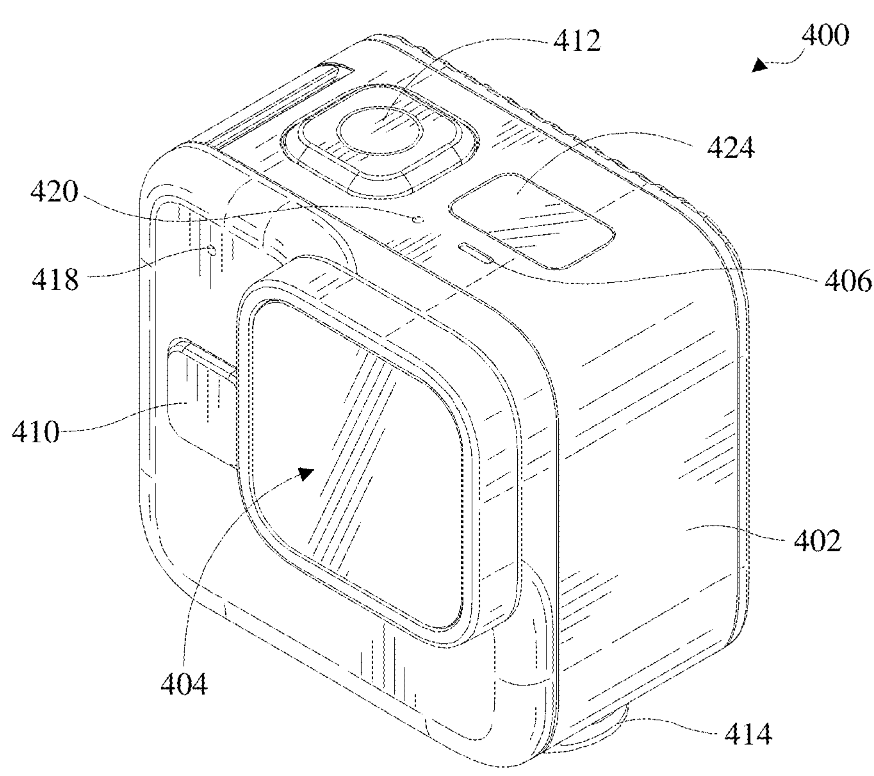
FIGS. 4A-4B are isometric views of another example of an image capture apparatus.
Figure 4B:
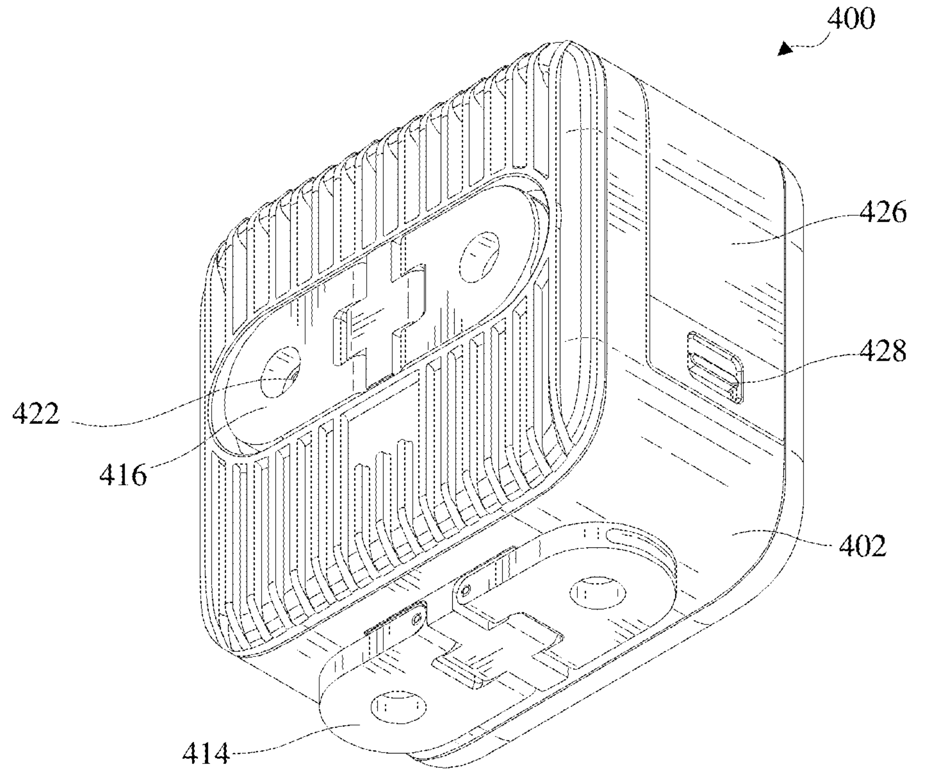

FIGS. 4A-4B illustrate another example of an image capture apparatus 400. The image capture apparatus 400 is similar to the image capture apparatus 100 shown in FIGS. 1A-1B and to the image capture apparatus 200 shown in FIGS. 2A-2B. The image capture apparatus 400 includes a body 402, an image capture device 404, an indicator 406, a mode button 410, a shutter button 412, interconnect mechanisms 414, 416, audio components 418, 420, 422, a display 424, and a door 426 including a release mechanism 428. The arrangement of the components of the image capture apparatus 400 shown in FIGS. 4A-4B is an example, other arrangements of elements may be used.

The body 402 of the image capture apparatus 400 may be similar to the body 102 shown in FIGS. 1A-1B. The image capture device 404 is structured on a front surface of the body 402. The image capture device 404 includes a lens and may be similar to the image capture device 104 shown in FIG. 1A.

As shown in FIG. 4A, the image capture apparatus 400 includes the indicator 406 on a top surface of the body 402. The indicator 406 may be similar to the indicator 106 shown in FIG. 1A. The indicator 406 may indicate a status of the image capture device 204. Although one indicator 406 is shown in FIGS. 4A, the image capture apparatus 400 may include other indictors structured on respective surfaces of the body 402.

As shown in FIGS. 4A, the image capture apparatus 400 includes input mechanisms including the mode button 410, structured on a front surface of the body 402, and the shutter button 412, structured on a top surface of the body 402. The mode button 410 may be similar to the mode button 110 shown in FIG. 1B. The shutter button 412 may be similar to the shutter button 112 shown in FIG. 1A.

The image capture apparatus 400 includes internal electronics (not expressly shown), such as imaging electronics, power electronics, and the like, internal to the body 402 for capturing images and performing other functions of the image capture apparatus 400. An example showing internal electronics is shown in FIG. 5.

As shown in FIGS. 4A-4B, the image capture apparatus 400 includes the interconnect mechanisms 414, 416, with a first interconnect mechanism 414 structured on a bottom surface of the body 402 and a second interconnect mechanism 416 disposed within a rear surface of the body 402. The interconnect mechanisms 414, 416 may be similar to the interconnect mechanism 140 shown in FIG. 1B and the interconnect mechanism 214 shown in FIG. 2A.

As shown in FIGS. 4A-4B, the image capture apparatus 400 includes the audio components 418, 420, 422 respectively structured on respective surfaces of the body 402. The audio components 418, 420, 422 may be similar to the microphones 128, 130, 132 and the speaker 138 shown in FIGS. 1A-1B. One or more of the audio components 418, 420, 422 may be, or may include, audio sensors, such as microphones, to receive and record audio signals, such as voice commands or other audio, in conjunction with capturing images or video. One or more of the audio components 418, 420, 422 may be, or may include, an audio presentation component that may present, or play, audio, such as to provide notifications or alerts.

As shown in FIGS. 4A-4B, a first audio component 418 is located on a front surface of the body 402, a second audio component 420 is located on a top surface of the body 402, and a third audio component 422 is located on a rear surface of the body 402. Other numbers and configurations for the audio components 418, 420, 422 may be used.

As shown in FIG. 4A, the image capture apparatus 400 includes the display 424 structured on a front surface of the body 402. The display 424 may be similar to the displays 108, 142 shown in FIGS. 1A-1B. The display 424 may include an I/O interface. The display 424 may receive touch inputs. The display 424 may display image information during video capture. The display 424 may provide status information to a user, such as status information indicating battery power level, memory card capacity, time elapsed for a recorded video, etc. The image capture apparatus 400 may include multiple displays structured on respective surfaces of the body 402. In some implementations, the display 424 may be omitted or combined with another component of the image capture apparatus 200.

As shown in FIG. 4B, the image capture apparatus 400 includes the door 426 structured on, or forming a portion of, the side surface of the body 402. The door 426 may be similar to the door 226 shown in FIG. 2B. The door 426 shown in FIG. 4B includes the release mechanism 428. The release mechanism 428 may include a latch, a button, or other mechanism configured to receive a user input that allows the door 426 to change position. The release mechanism 428 may be used to open the door 426 for a user to access a battery, a battery receptacle, an I/O interface, a memory card interface, etc.

In some embodiments, the image capture apparatus 400 may include features or components other than those described herein, some features or components described herein may be omitted, or some features or components described herein may be combined. For example, the image capture apparatus 400 may include additional interfaces or different interface features, interchangeable lenses, cold shoes, or hot shoes.

FIG. 5 is a block diagram of electronic components in an image capture apparatus 500. The image capture apparatus 500 may be a single-lens image capture device, a multi-lens image capture device, or variations thereof, including an image capture apparatus with multiple capabilities such as the use of interchangeable image sensor lens assemblies. Components, such as electronic components, of the image capture apparatus 100 shown in FIGS. 1A-B, the image capture apparatus 200 shown in FIGS. 2A-B, the image capture apparatus 300 shown in FIG. 3, or the image capture apparatus 400 shown in FIGS. 4A-4B, may be implemented as shown in FIG. 5.

The image capture apparatus 500 includes a body 502. The body 502 may be similar to the body 102 shown in FIGS. 1A-1B, the body 202 shown in FIGS. 2A-2B, or the body 402 shown in FIGS. 4A-4B. The body 502 includes electronic components such as capture components 510, processing components 520, data interface components 530, spatial sensors 540, power components 550, user interface components 560, and a bus 580.

The capture components 510 include an image sensor 512 for capturing images. Although one image sensor 512 is shown in FIG. 5, the capture components 510 may include multiple image sensors. The image sensor 512 may be similar to the image sensors 342, 346 shown in FIG. 3. The image sensor 512 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 512 detects light, such as within a defined spectrum, such as the visible light spectrum or the infrared spectrum, incident through a corresponding lens such as the first lens 330 with respect to the first image sensor 342 or the second lens 332 with respect to the second image sensor 346 as shown in FIG. 3. The image sensor 512 captures detected light as image data and conveys the captured image data as electrical signals (image signals or image data) to the other components of the image capture apparatus 500, such as to the processing components 520, such as via the bus 580.

The capture components 510 include a microphone 514 for capturing audio. Although one microphone 514 is shown in FIG. 5, the capture components 510 may include multiple microphones. The microphone 514 detects and captures, or records, sound, such as sound waves incident upon the microphone 514. The microphone 514 may detect, capture, or record sound in conjunction with capturing images by the image sensor 512. The microphone 514 may detect sound to receive audible commands to control the image capture apparatus 500. The microphone 514 may be similar to the microphones 128, 130, 132 shown in FIGS. 1A-1B, the audio components 218, 220, 222 shown in FIGS. 2A-2B, or the audio components 418, 420, 422 shown in FIGS. 4A-4B.

The processing components 520 perform image signal processing, such as filtering, tone mapping, or stitching, to generate, or obtain, processed images, or processed image data, based on image data obtained from the image sensor 512. The processing components 520 may include one or more processors having single or multiple processing cores. In some implementations, the processing components 520 may include, or may be, an application specific integrated circuit (ASIC) or a digital signal processor (DSP). For example, the processing components 520 may include a custom image signal processor. The processing components 520 conveys data, such as processed image data, with other components of the image capture apparatus 500 via the bus 580. In some implementations, the processing components 520 may include an encoder, such as an image or video encoder that may encode, decode, or both, the image data, such as for compression coding, transcoding, or a combination thereof.

Although not shown expressly in FIG. 5, the processing components 520 may include memory, such as a random-access memory (RAM) device, which may be non-transitory computer-readable memory. The memory of the processing components 520 may include executable instructions and data that can be accessed by the processing components 520.

The data interface components 530 communicates with other, such as external, electronic devices, such as a remote control, a smartphone, a tablet computer, a laptop computer, a desktop computer, or an external computer storage device. For example, the data interface components 530 may receive commands to operate the image capture apparatus 500. In another example, the data interface components 530 may transmit image data to transfer the image data to other electronic devices. The data interface components 530 may be configured for wired communication, wireless communication, or both. As shown, the data interface components 530 include an I/O interface 532, a wireless data interface 534, and a storage interface 536. In some implementations, one or more of the I/O interface 532, the wireless data interface 534, or the storage interface 536 may be omitted or combined.

The I/O interface 532 may send, receive, or both, wired electronic communications signals. For example, the I/O interface 532 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 532 is shown in FIG. 5, the data interface components 530 include multiple I/O interfaces. The I/O interface 532 may be similar to the data interface 124 shown in FIG. 1B.

The wireless data interface 534 may send, receive, or both, wireless electronic communications signals. The wireless data interface 534 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 534 is shown in FIG. 5, the data interface components 530 include multiple wireless data interfaces. The wireless data interface 534 may be similar to the data interface 124 shown in FIG. 1B.

The storage interface 536 may include a memory card connector, such as a memory card receptacle, configured to receive and operatively couple to a removable storage device, such as a memory card, and to transfer, such as read, write, or both, data between the image capture apparatus 500 and the memory card, such as for storing images, recorded audio, or both captured by the image capture apparatus 500 on the memory card. Although one storage interface 536 is shown in FIG. 5, the data interface components 530 include multiple storage interfaces. The storage interface 536 may be similar to the data interface 124 shown in FIG. 1B.

The spatial, or spatiotemporal, sensors 540 detect the spatial position, movement, or both, of the image capture apparatus 500. As shown in FIG. 5, the spatial sensors 540 include a position sensor 542, an accelerometer 544, and a gyroscope 546. The position sensor 542, which may be a global positioning system (GPS) sensor, may determine a geospatial position of the image capture apparatus 500, which may include obtaining, such as by receiving, temporal data, such as via a GPS signal. The accelerometer 544, which may be a three-axis accelerometer, may measure linear motion, linear acceleration, or both of the image capture apparatus 500. The gyroscope 546, which may be a three-axis gyroscope, may measure rotational motion, such as a rate of rotation, of the image capture apparatus 500. In some implementations, the spatial sensors 540 may include other types of spatial sensors. In some implementations, one or more of the position sensor 542, the accelerometer 544, and the gyroscope 546 may be omitted or combined.

The power components 550 distribute electrical power to the components of the image capture apparatus 500 for operating the image capture apparatus 500. As shown in FIG. 5, the power components 550 include a battery interface 552, a battery 554, and an external power interface 556 (ext. interface). The battery interface 552 (bat. interface) operatively couples to the battery 554, such as via conductive contacts to transfer power from the battery 554 to the other electronic components of the image capture apparatus 500. The battery interface 552 may be similar to the battery receptacle 126 shown in FIG. 1B. The external power interface 556 obtains or receives power from an external source, such as a wall plug or external battery, and distributes the power to the components of the image capture apparatus 500, which may include distributing power to the battery 554 via the battery interface 552 to charge the battery 554. Although one battery interface 552, one battery 554, and one external power interface 556 are shown in FIG. 5, any number of battery interfaces, batteries, and external power interfaces may be used. In some implementations, one or more of the battery interface 552, the battery 554, and the external power interface 556 may be omitted or combined. For example, in some implementations, the external interface 556 and the I/O interface 532 may be combined.

The user interface components 560 receive input, such as user input, from a user of the image capture apparatus 500, output, such as display or present, information to a user, or both receive input and output information, such as in accordance with user interaction with the image capture apparatus 500.

As shown in FIG. 5, the user interface components 560 include visual output components 562 to visually communicate information, such as to present captured images. As shown, the visual output components 562 include an indicator 564 and a display 566. The indicator 564 may be similar to the indicator 106 shown in FIG. 1A, the indicators 208 shown in FIGS. 2A-2B, or the indicator 406 shown in FIG. 4A. The display 566 may be similar to the display 108 shown in FIG. 1A, the display 142 shown in FIG. 1B, the display 224 shown in FIG. 2B, or the display 424 shown in FIG. 4A. Although the visual output components 562 are shown in FIG. 5 as including one indicator 564, the visual output components 562 may include multiple indicators. Although the visual output components 562 are shown in FIG. 5 as including one display 566, the visual output components 562 may include multiple displays. In some implementations, one or more of the indicator 564 or the display 566 may be omitted or combined.

As shown in FIG. 5, the user interface components 560 include a speaker 568. The speaker 568 may be similar to the speaker 138 shown in FIG. 1B, the audio components 218, 220, 222 shown in FIGS. 2A-2B, or the audio components 418, 420, 422 shown in FIGS. 4A-4B. Although one speaker 568 is shown in FIG. 5, the user interface components 560 may include multiple speakers. In some implementations, the speaker 568 may be omitted or combined with another component of the image capture apparatus 500, such as the microphone 514.

As shown in FIG. 5, the user interface components 560 include a physical input interface 570. The physical input interface 570 may be similar to the mode buttons 110, 210, 410 shown in FIGS. 1A, 2A, and 4A or the shutter buttons 112, 212, 412 shown in FIGS. 1A, 2B, and 4A. Although one physical input interface 570 is shown in FIG. 5, the user interface components 560 may include multiple physical input interfaces. In some implementations, the physical input interface 570 may be omitted or combined with another component of the image capture apparatus 500. The physical input interface 570 may be, for example, a button, a toggle, a switch, a dial, or a slider.

As shown in FIG. 5, the user interface components 560 include a broken line border box labeled "other" to indicate that components of the image capture apparatus 500 other than the components expressly shown as included in the user interface components 560 may be user interface components. For example, the microphone 514 may receive, or capture, and process audio signals to obtain input data, such as user input data corresponding to voice commands. In another example, the image sensor 512 may receive, or capture, and process image data to obtain input data, such as user input data corresponding to visible gesture commands. In another example, one or more of the spatial sensors 540, such as a combination of the accelerometer 544 and the gyroscope 546, may receive, or capture, and process motion data to obtain input data, such as user input data corresponding to motion gesture commands.

Figure 6:
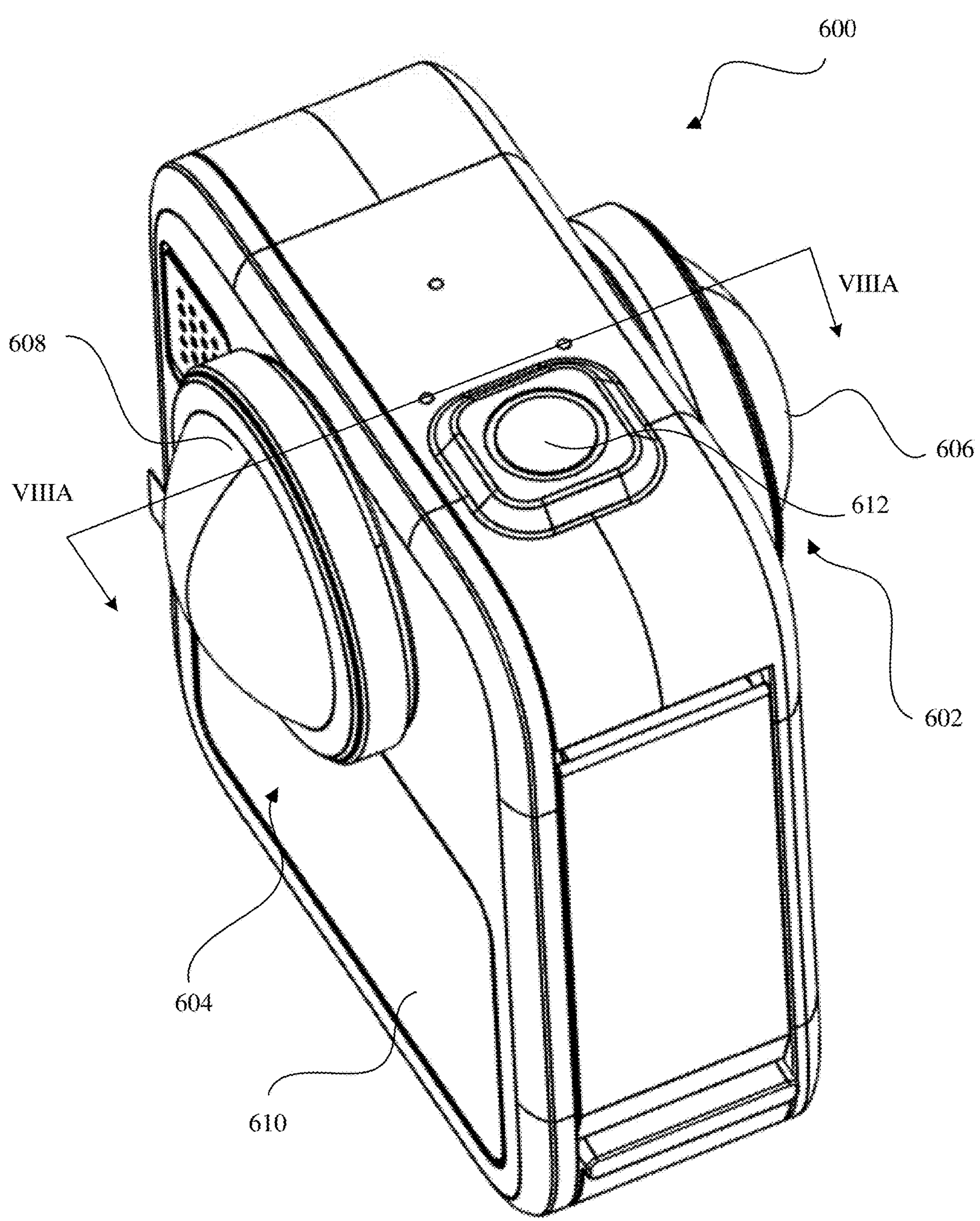
FIG. 6 is a rear isometric view of another example of an image capture apparatus.

FIG. 6 is an isometric view of an image capture apparatus 600 having a first image sensor and lens assembly (first ISLA) 602 on a first side and a second image sensor and lens assembly (second ISLA) 604. The first ISLA 602 and the second ISLA 604 are located back-to-back and extend out of opposing sides of the image capture apparatus 600. The first ISLA 602 is covered by a first outer lens 606 and the second ISLA 604 is covered by a second outer lens 608.

The first outer lens 606 is removable from the first ISLA 602. The second outer lens 608 is removable from the second ISLA 604. The second side (rear) of the image capture apparatus 600 includes a display 610. The display 610 may allow a user to switch between the first ISLA 602 and the second ISLA 604 or to capture images with both the first ISLA 602 and the second ISLA 604 simultaneously. The display 610 may be a touch screen allow a user to toggle the image capture apparatus 600 between settings, modes, sensors, or a combination thereof. The display 610 may be in communication with or electrically connected to a shutter button 612.

The shutter button 612 when actuated may activate the first ISLA 602, the second ISLA 604, or both. The shutter button 612 may be connected to the display 610 such that when the display 610 is used to change settings between the first ISLA 602 and the second ISLA 604.

Figures 7A, 7B:
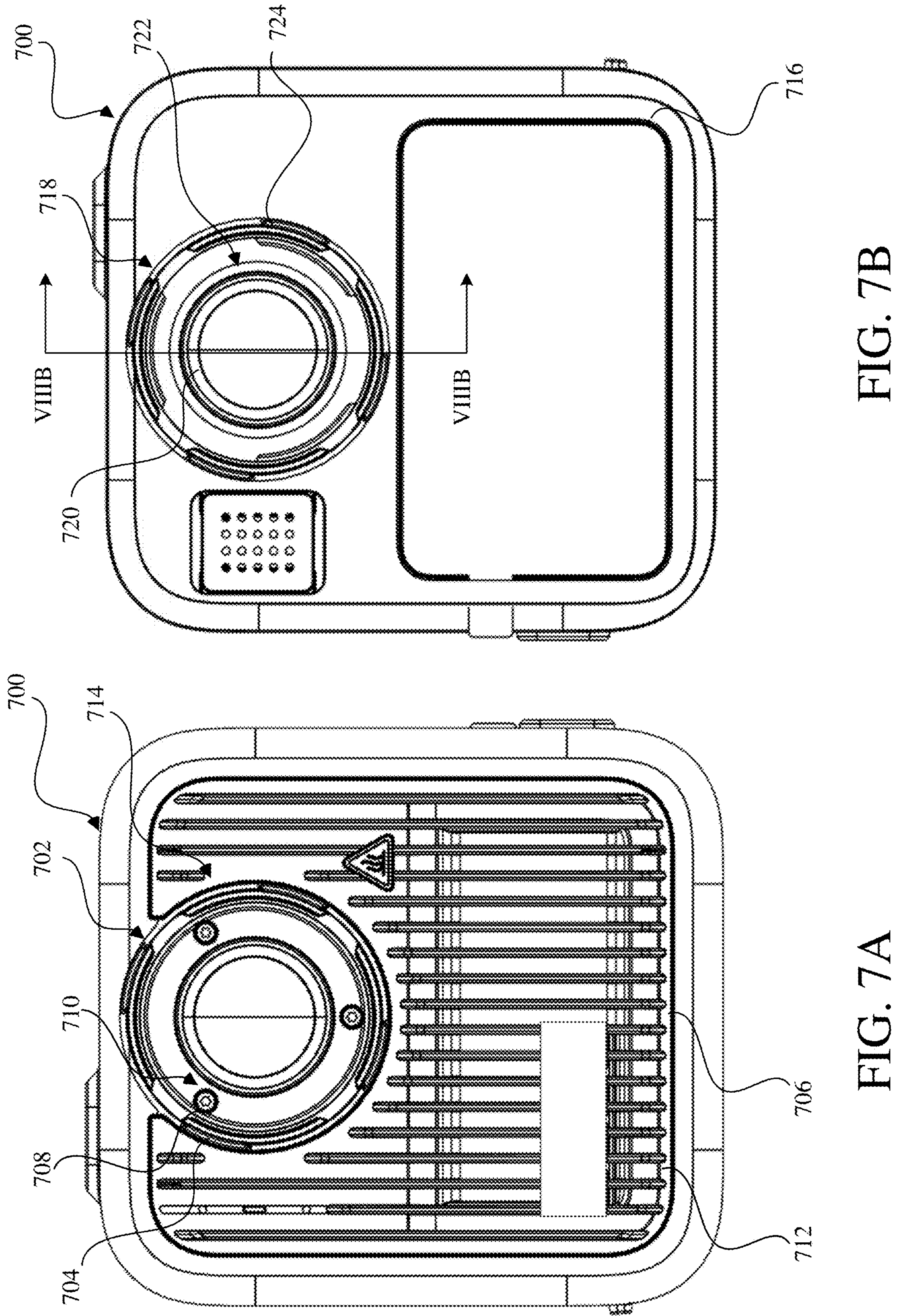
FIG. 7A is a front view of the image capture apparatus of FIG. 6 with an outer lens removed.
FIG. 7B is a rear view of the image capture apparatus of FIG. 6 with an outer lens removed.

FIG. 7A is a front plan view of an image capture apparatus 700, such as the image capture apparatus 600 of FIG. 6, having a first ISLA 702 and the first outer lens 606 (FIG. 6) removed to expose a forward mounting structure 704. The forward mounting structure 704 is connected to a forward surface 706 of the image capture apparatus 700 by fasteners 708 that extend through apertures 710 of the forward mounting structure 704. The first ISLA 702 may directly connect to the forward mounting structure 704 by directly connecting to an interior of the forward mounting structure 704. The first ISLA 702 may extend directly into the forward mounting structure 704. The first ISLA 702 may be aligned along an optical axis by the forward mounting structure 704. The first ISLA 702 may be connected to the forward mounting structure 704 by a friction fit, detents, threads, fasteners, or a combination thereof.

The forward mounting structure 704 may be in communication with the forward surface 706 of the image capture apparatus 700. The forward mounting structure 704 may have a portion that extends into the forward surface 706 of the image capture apparatus 700 and a portion that is located outside of the forward surface. The forward mounting structure 704 may be a bayonet. The forward mounting structure 704 may include an interior connector so that an ISLA such as the first ISLA 702 is connected within the image capture apparatus 700. The forward mounting structure 704 may include an exterior connector to connect a lens such as the first outer lens 606 to the front of the image capture apparatus 700. The forward surface 706 of the image capture apparatus 700 includes a heatsink 712 with a recess 714 that extends through the heatsink 712.

The heatsink 712 may be in thermal communication with the first ISLA 702 or other heat generating components. Heat from the first ISLA 702 may be transmitted to the heatsink 712 through the forward mounting structure 704. The heat generating components may be a microprocessor, processor, an image sensor, or a combination thereof. The heatsink 712 forms the forward surface and is in communication with the forward mounting structure 704. The heatsink 712 may be made of metal or some other thermally conductive material.

The heatsink 712 may include a ferrous material, copper, iron, nickel, steel, or a combination thereof. The heatsink 712 may include a recess 714 that extends therethrough.

The recess 714 may extend from the forward surface toward a rearward surface of the heatsink 712. The recess 714 may be circular, square, rectangular, a shape that mirrors the first ISLA 702, a shape that mirrors the forward mounting structure 704, or a combination thereof. The forward mounting structure 704 may contact the heatsink 712 and a portion of the forward mounting structure 704 extends into or through the recess 714. The forward mounting structure 704 and the heatsink 712 may be in thermal communication. The mounting structure 704 may be free of a fixed connection with the heatsink 712 or a forward surface of the image capture apparatus 700. The forward mounting structure 704 may have a portion that is forward of the forward surface of the image capture apparatus 700 (e.g., external) and a portion that is located rearward of the forward surface (e.g., internal). Fasteners 708 extend through the portion of the forward mounting structure 704 into the heatsink 712 to form a fixed connection so that the forward mounting structure 704 is aligned relative to the heatsink 712 (e.g., along the optical axis).

FIG. 7B is a rear plan view of the image capture apparatus 700, such as the image capture apparatus 600 of FIG. 6. The image capture apparatus 700 has a rear surface 716 that includes a rear mounting structure 718. The rear mounting structure 718 is aligned relative to the rear surface 716 by the connection between the forward surface 706 and the forward mounting structure 704 depicted in FIG. 7A. As shown, the rear mounting structure 718 is aligned within the image capture apparatus 700 by the forward mounting structure 704 in FIG. 7A. The rear mounting structure 718 is free of direct connection with the rear surface 716 to align the rear mounting structure 718 within the image capture apparatus 700. The rear mounting structure 718 and the rear surface 716 may be connected together once the rear mounting structure 718 is located within the image capture apparatus 700 to provide waterproofing. A seal may be applied to the rear surface 716 and the rear mounting structure 718 to prevent fluids and debris from entering the image capture apparatus 700. The seal may not provide structure alignment. The rear mounting structure 718 may be aligned along the optical axis of the image capture apparatus 700 so that when a second ISLA 720 is in communication with the rear mounting structure 718 the second ISLA 720 is aligned along the optical axis.

The second ISLA 720 may extend into an interior 722 of the rear mounting structure 718. The interior 722 may be an aperture that receives all or a portion of the second ISLA 720. The interior 722 of the rear mounting structure 718 may fixedly connect the second ISLA 720 within the rear mounting structure 718. The interior 722 may fixedly connect the second ISLA 720 to the rear mounting structure 718 by one or more connection devices. The interior 722 may form a connection with detents, threads, a friction fit, or a combination thereof. The interior 722 of the rear mounting structure 718 may connect the second ISLA 720 to a rearward side of the image capture apparatus 700 when the second ISLA 720 is located within the rear mounting structure 718. The rear mounting structure 718 may include an exterior 724 a second outer lens 608 of FIG. 6 may extend over the second ISLA 720 and connect to the exterior 724 of the rear mounting structure 718.

The exterior 724 allows the second outer lens 608 to be removably connected over the second ISLA 720. The exterior 724 for the rear mounting structure 718 may create a watertight and removable connection. The exterior 724 may be a bayonet or a bayonet connection. The exterior 724 may create a radial connection with the second outer lens 607. As discussed above, the rear mounting structure 718 may be sealed with the rear surface 716 so that when the second outer lens 607 is removed, the image capture apparatus 700 remails watertight and/or waterproof.

Figure 8A:
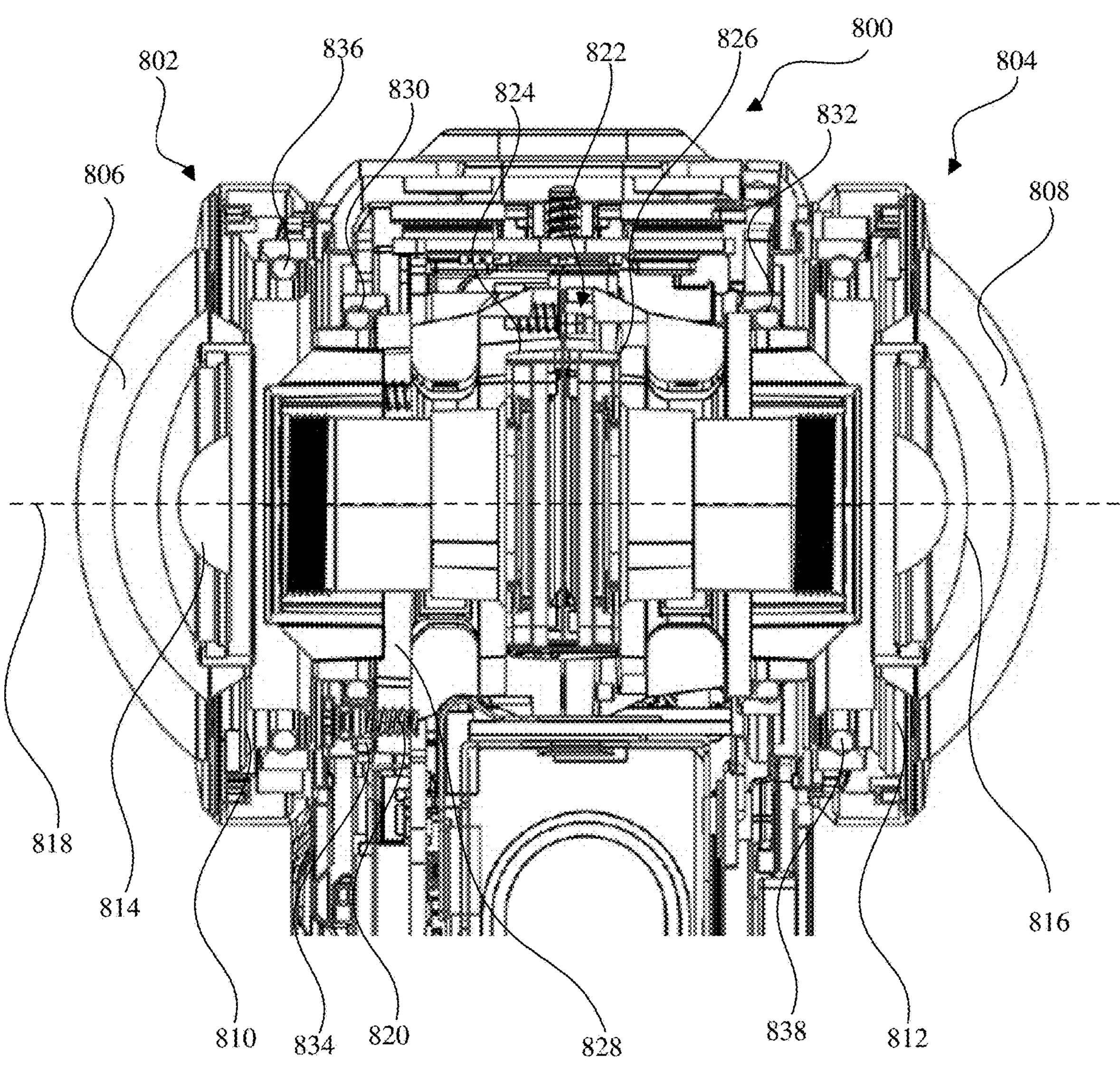
FIG. 8A is a cross sectional view of FIG. 6 along lines VIIIA-VIIIA.

FIG. 8A is a cross-sectional view of an image capture apparatus 800, such as the image capture apparatus 600 of FIG. 6 along lines VIIIA-VIIIA of FIG. 7B. The image capture apparatus 800 has a forward side 802 (e.g., a front of the housing) and a rearward side 804 (e.g., a rear of the housing). The forward side 802 includes a forward outer lens 806 and the rearward side 804 includes a rearward outer lens 808. The forward outer lens 806 is connected to the forward side 802 by a forward mounting structure 810. The rearward outer lens 808 is connected to the rearward side 804 by a rearward mounting structure 812. The forward mounting structure 810 and the rearward mounting structure 812 may be substantially identical (e.g., may both be bayonets).

The forward mounting structure 810 is in communication with a forward image sensor and lens assembly (forward ISLA) 814, and the rearward mounting structure 812 is in communication with a rearward image sensor and lens assembly (rearward ISLA) 816. The forward ISLA 814 and the rearward ISLA 816 are located in a back-to-back relationship along an optical axis 818. The forward ISLA 814 and the rearward ISLA 816 may be back-to-back but not aligned along the optical axis 818. The forward ISLA 814 and the rearward ISLA 816 may be coaxial. The forward ISLA 814 and the rearward ISLA 816 may have axes that are parallel but not coaxial. The forward ISLA 814 is aligned with the forward side 802 by fasteners 820 that extend into the forward mounting structure 810 and into the forward side 802. The rearward ISLA 816 is connected within the image capture apparatus 800 only through the connection formed by the fasteners 820. For example, the forward mounting structure 810 is connected to the forward side 802 and the rearward mounting structure 812 is connected to the forward mounting structure 810 so that the rearward mounting structure 812 does not have any additional support to be connected within the image capture apparatus 800. The forward mounting structure 810 may be directly connected to the forward side 802 by the fasteners 820.

The fasteners 820 extend from an external side of the forward mounting structure 810 so that when the forward outer lens 806 is removed, the fasters are accessible and so that the forward mounting structure 810 is connectable from a location outside of the image capture apparatus 800. The rearward mounting structure 812 is free of fasteners and is axially aligned along the optical axis 818 based on the connection of the forward mounting structure 810 with the forward side 802. The forward ISLA 814 and the forward mounting structure 810 are connected to the rearward ISLA 816 and the rearward mounting structure 812 by a connector module 822.

The connector module 822 aligns the forward ISLA 814 and the rearward ISLA 816 along the optical axis 818 (e.g., either coaxially or along parallel axes). The connector module 822 may support the rearward ISLA 816 so that the rearward ISLA 816 extends cantilevered through the image capture apparatus 800. For example, the only fixed connection associated with the forward ISLA 814 and the rearward ISLA 816 may be at the forward end of the image capture apparatus 800. Thus, the connection through the connector module 822 permits the rearward ISLA 816 to be indirectly connected within the image capture apparatus 800. For example, the rearward ISLA 816, the rearward mounting structure 812, or both may be free of a direction connection with the rearward side 804. The connector module 822 connect the forward ISLA 814 and the rearward ISLA 816 along the optical axis 818 without any intervening connections, without connections at opposing ends, or both. The connector module 822 may be divided into a forward connector module 824 and a rearward connector module 826.

The forward connector module 824 may extend axially from a center region of the image capture apparatus 800 towards the forward side 802. The forward connector module 824 may include flanges 828 that connect to the forward side 802, the forward mounting structure 810, or both. The flanges 828 may receive one or more fasteners 820. The flanges 828 may support the forward connector module 824 and the rearward connector module 826 relative to the forward side 802. The flanges 828 may axially align the forward connector module 824 with the forward mounting structure 810 and the forward side 802 (e.g., a wall or a housing). The forward connector module 824 may be connected to the rearward connector module 826 so that the rearward connector module 826 extends towards the rearward side 804 without any additional support. The rearward connector module 826 may provide the only support for the rearward ISLA 816.

The rearward connector module 826 supports the rearward ISLA 816 relative to the forward connector module 824. The rearward connector module 826 may be connected with and mirror the forward connector module 824. The rearward connector module 826 and the forward connector module 824 may be connected by fasteners, locking tabs, threads, detents, twist and lock features, or a combination thereof. The rearward connector 826 may allow the rearward ISLA 816 to extend cantilever therefrom. The rearward connector 826 and the forward connector 824 may connect the forward ISLA 814 and the rearward ISLA 816 along the optical axis 818. The forward connector module 824 and the rearward connector module 826 may sealed via one or more forward lens mount seals 830 and one or more rearward lens mount seals 832, respectively.

The forward lens mount seals 830 may extend around an outside of the forward connector module 824. The forward lens mount seals 830 may extend between the forward connector module 824 and the forward mount structure 810. The forward lens mount seals 830 may be compressed between the forward connector module 824 and the forward mount structure 810. The forward lens mount seals 830 may prevent fluids from entering the image capture apparatus 800 when the forward outer lens 806 is removed. The forward lens mount seals 830 may be a continuous part. The forward lens mount seals 830 may be made of or include an elastomer, rubber, a polymer, a felt, a fabric, a hydrophobic material, a rigid material, a compressible material, or a combination thereof. The rearward connector module 826 may have a portion that is surrounded by a rearward lens mount seal or seals 832.

The rearward lens mount seals 832 function to prevent fluids from entering into the rearward end of the image capture apparatus 800 when the rearward outer lens 808 is removed. The rearward lens mount seals 832 may be identical to the forward lens mount seals 830 in a mirrored fashion to one another. The rearward lens mount seals 832 may be located between the rearward mounting structure 812 and the rearward connector module 826. The rearward lens mount seals 832 may be made of a same material as the forward lens mount seals 830 discussed herein. Other seals may be located within the image capture apparatus 800 such as fastener seals 834, forward lens seals 836, and rearward lens seals 838. All of the seals discussed herein may be made of a same material or any material discussed herein.

The fastener seals 834 may be located adjacent to or around the fasteners 820 located within the image a capture apparatus 800. The fastener seals 834 may be compressed by a head of a fastener 820. The fastener seals 834 may be compressed between an aperture that receives the fastener 820 or a portion of the fastener 820. The fastener seals 834 may be an o ring. The fastener seals 834 may be located within the image capture apparatus 800 and then retained in place by the fasteners 820 being inserted into a recess. The fastener seals 834 may be the same as the lens mount seals 830 and 832 and the lens seals 836 and 838 but with a smaller circumference or cross-sectional length.

The forward lens seals 836 and the rearward lens seals 838 may prevent fluid from extending between the forward mounting structure 810 and the forward outer lens 806 and the rearward mounting structure 812 and the rearward outer lens 808, respectively. Thus, the forward lens seals 836 prevent fluid from extending past the forward outer lens 806 and the forward mounting structure 810 and the rearward lens seals 838 prevent fluid from extending past the rearward outer lens 808 and the rearward mounting structure 812. The forward lens seals 836 and the rearward lens seal 838 may single seals or multiple seals. The forward lens seals 836 and the rearward lens seals 838 may prevent fluid from coming into direct contact with the forward ISLA 814 and the rearward ISLA 816, respectively, when the forward outer lens 806 and the rearward outer lens 808 are in place. However, if the forward lens seal 836 fails or the forward outer lens 806 is removed, the forward lens mount seals 830 seal the image capture apparatus 800 so that fluid is prevented from entering an internal cavity or interior of the image capture apparatus 800. Similarly, if the rearward lens seals 838 fail or the rearward outer lens 806 is removed, the rearward lens mount seals 832 seal the image capture apparatus 800 so that fluid is prevented from entering an internal of the image capture apparatus 800.

Figure 8B:
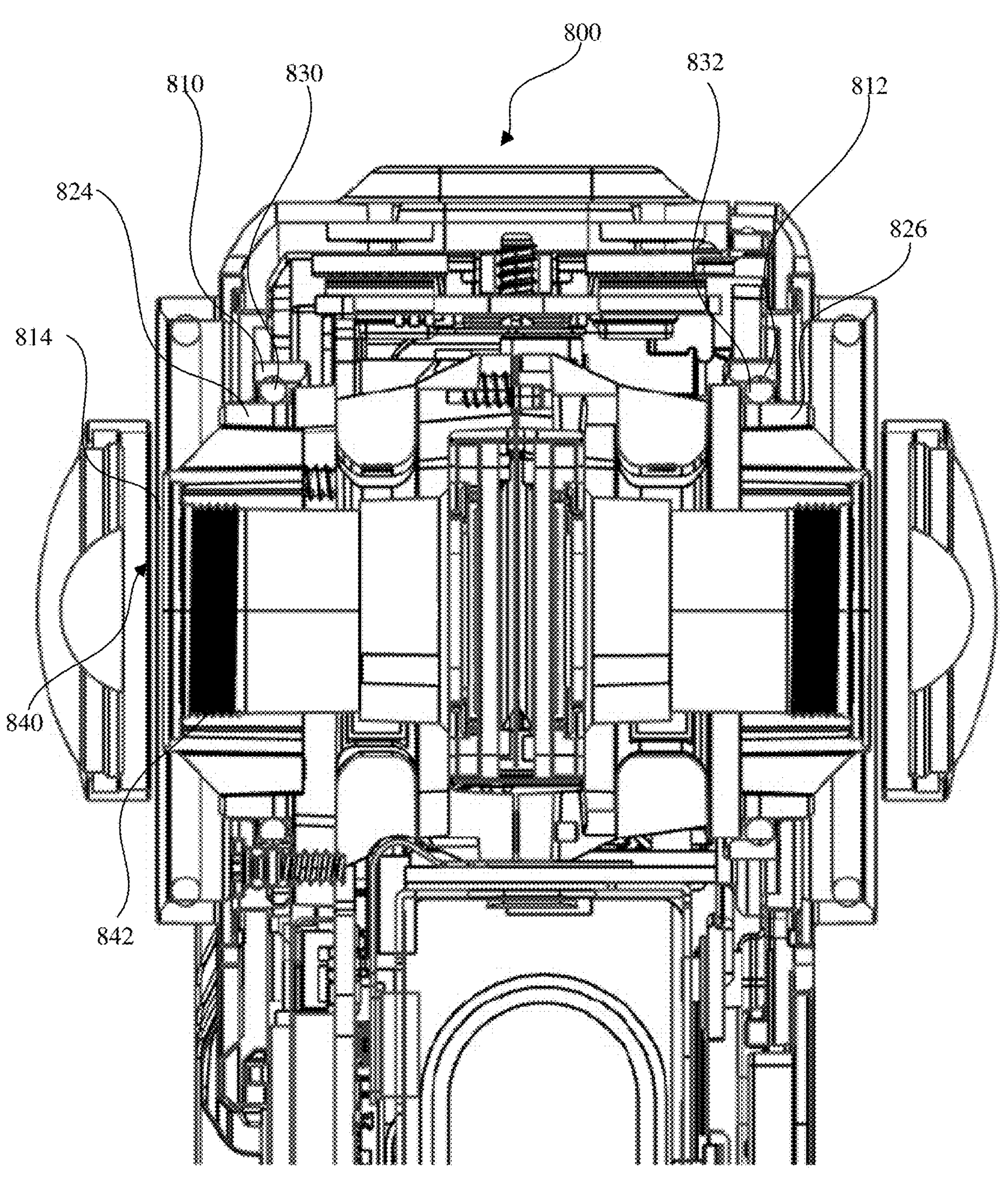
FIG. 8B is a cross sectional view of FIG. 7A along lines VIIIB-VIIIB.

FIG. 8B is a cross-sectional view of the image capture apparatus 600, 700, 800 of FIG. 7B along lines VIIIB-VIIIB with the forward outer lens 806 and the rearward outer lens 808 removed. With the outer lenses 806 and 808 removed, the image capture apparatus 800 remains water resistant and prevents fluids from entering the image capture apparatus 800. With the forward outer lens 806 and the rearward outer lens 808 removed the forward lens mount seals 830 and the rearward lens mount seals 832 prevent fluid and/or debris from extending into the image capture apparatus 800. The rearward lens mount seal 832 is located between the rearward mounting structure 812 and the rearward connector module 826 to prevent fluid and/or debris from extending into the rear of the image capture apparatus.

The forward lens mount seals 830 are located between a forward mounting structure 810 and a forward connector module 824 to prevent fluid from passing around the forward mounting structure 810 and the forward connector module 824. Thus, the image capture apparatus 800 is sealed with or without the outer lenses 806, 808 being present or even if the outer lenses 806, 808 become compromised or broken. The forward connector module 824 and rearward connector module 826 include apertures 840.

The aperture 840 functions to receive an ISLA (e.g., forward ISLA 814 or rearward ISLA 816). As shown the aperture 840 in the forward connector module 824 receives the forward ISLA 814. The forward ISLA 814 extends partially into the aperture 840 and partially beyond or out of the aperture 840. The aperture 840 aligns the forward ISLA 814 within the image capture apparatus 800. The aperture 840 may include connection features 842.

The connection features 842 function to align the forward ISLA 814 relative to the forward connector module 824 (and the rearward ISLA 816 to the rearward connector module 826). The connection features 842 may directly connect the forward ISLA 814 to the forward connector module 824. The connection features 842 may form a fixed connection between the forward ISLA 814 and the forward connector module 824. The connection features 842 may be a detent, press fit, threads, barbs, or a combination thereof.

Figure 9:
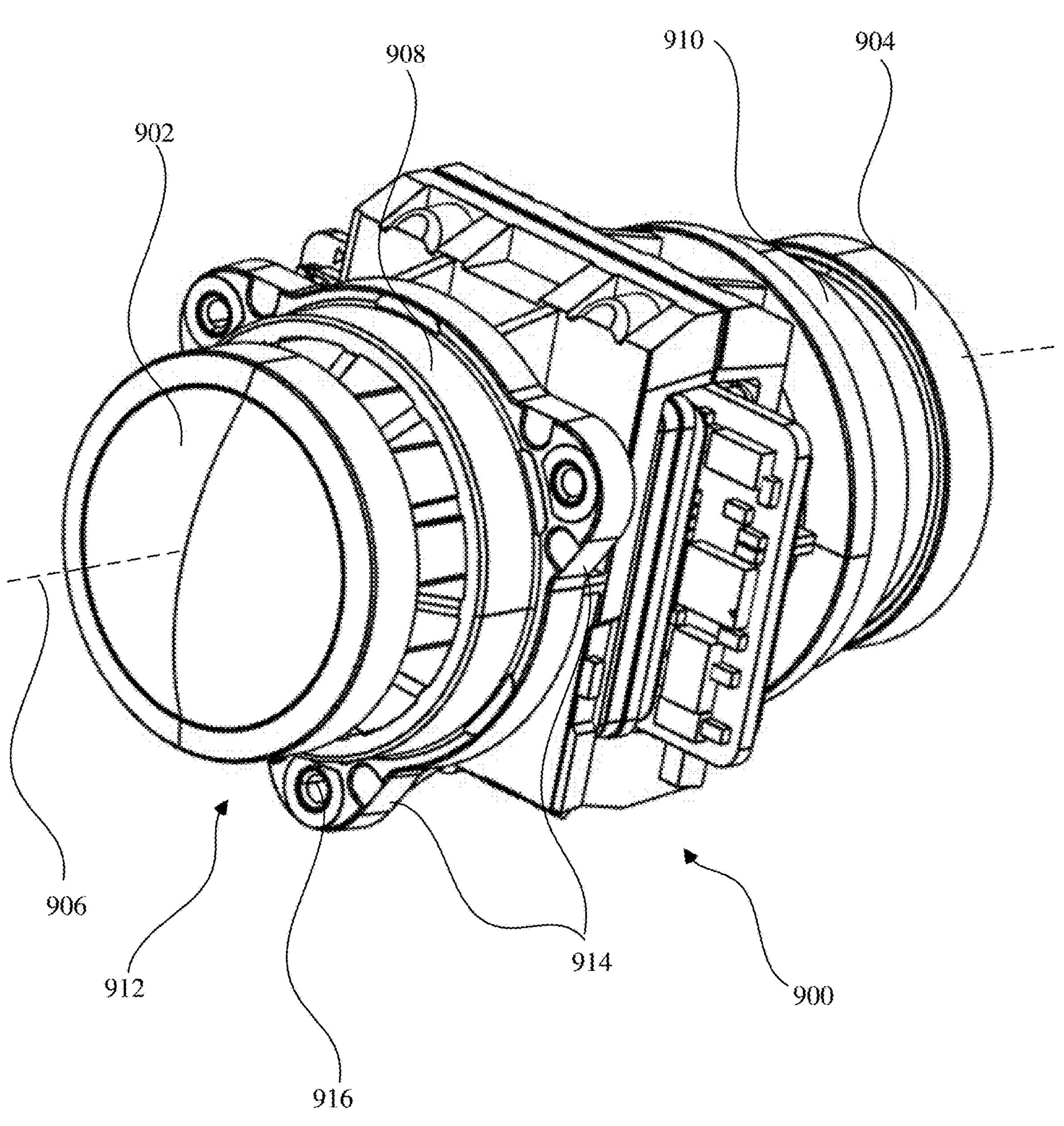
FIG. 9 is an isometric view of two image sensor and lens assemblies back-to-back.

FIG. 9 is an isometric view of a connector module 900 connecting a forward ISLA 902 and a rearward ISLA 904 in a back-to-back relationship relative to one another. The forward ISLA 902 and the rearward ISLA 904 extend along an optical axis 906. The connector module 900 includes a forward connector module 908 that retains the forward ISLA 902 and a rearward connector module 910 that retains the rearward ISLA 904. The forward connector module 908 and the rearward connector module 910 may connect directly together.

The forward connector module 908 houses the forward ISLA 902 so that the forward ISLA 902 is fixed within the forward connector module 908. For example, the forward ISLA 902 may be connected to a forward mounting structure (such as the forward mounting structure 810 of FIG. 8A), to the forward connector module 908, or both. The forward connector module 908 may retain lenses of the ISLA, the image sensor, or both within the connector module 900 so that the forward ISLA 902 is retained within the image capture device (e.g., 800 of FIG. 8A). The forward connector module 908 may include an aperture 912.

The aperture 912 may receive all or a portion of the forward ISLA 902. The aperture 912 may be sufficiently long to receive all of the forward ISLA 902. The aperture 912 may receive a portion of the forward ISLA 902 and a portion of the forward ISLA 902 may extend forward of the aperture 912. The aperture 912 may include a connection feature (e.g., 842) that connects the forward ISLA 902 to the forward connector module 908. The connection feature may form a direct connection between the forward ISLA 902 and the forward connector module 908. The connection feature may align the forward ISLA 902 to the forward connector module 908 and flanges 914 may align the forward connector module 908 with the image capture apparatus 100, 200, 300, 400, 500, 600.

The flanges 914 may connect to a surface of the image capture apparatus 100, 200, 300, 400, 500, 600. The flanges 914 may abut a surface (e.g., forward surface 706 of FIG. 7A). The flanges 914 may maintain the forward connector module 908 substantially orthogonal to the surface. The flanges 914 may prevent the forward connector module 908 from moving in any direction relative to a surface (e.g., up, down, left, right). The flange 914 may be an only connection that supports the forward ISLA 902 and the rearward ISLA 904. The flanges 914 may include recesses 916.

The recesses 916 function to connect the flanges to a surface of the image capture apparatus 100, 200, 300, 400, 500, 600. The recesses 916 may be a through hole in a flange 914 that assists in connecting the flange 914 to the surface. The recesses 916 may receive one or more fasteners, connectors, connection devices, or a combination thereof. The recesses 916 may be threaded or smooth. The recesses 916 may align with recesses or holes in a surface, a mounting structure, or both so that the forward ISLA 902, rearward ISLA, or both extend along the optical axis 906 (e.g., coaxially or in a parallel relationship). The recesses 916 may receive a bolt, screw, threaded member, or a combination thereof. The recesses 916 may form a fixed connection from a single direction (e.g., direction extending from the font to the back). As shown, the rearward connector module 910 is free of recesses 916, free of a connection, or both.

The rearward connector module 910 may only form a connection with the forward connector module 908. The rearward connector module 910 may be free of any other attachment for support. The rearward connector module 910 may be free of flanges, recesses, or both. The rearward connector module 910 includes an aperture that receives the rearward ISLA 904. The rearward connector module 910 may form a cantilevered connection with the forward connector module 908 so that the rearward connector module 910 is aligned with the forward connector module 908 along the optical axis 906.

Figure 10:
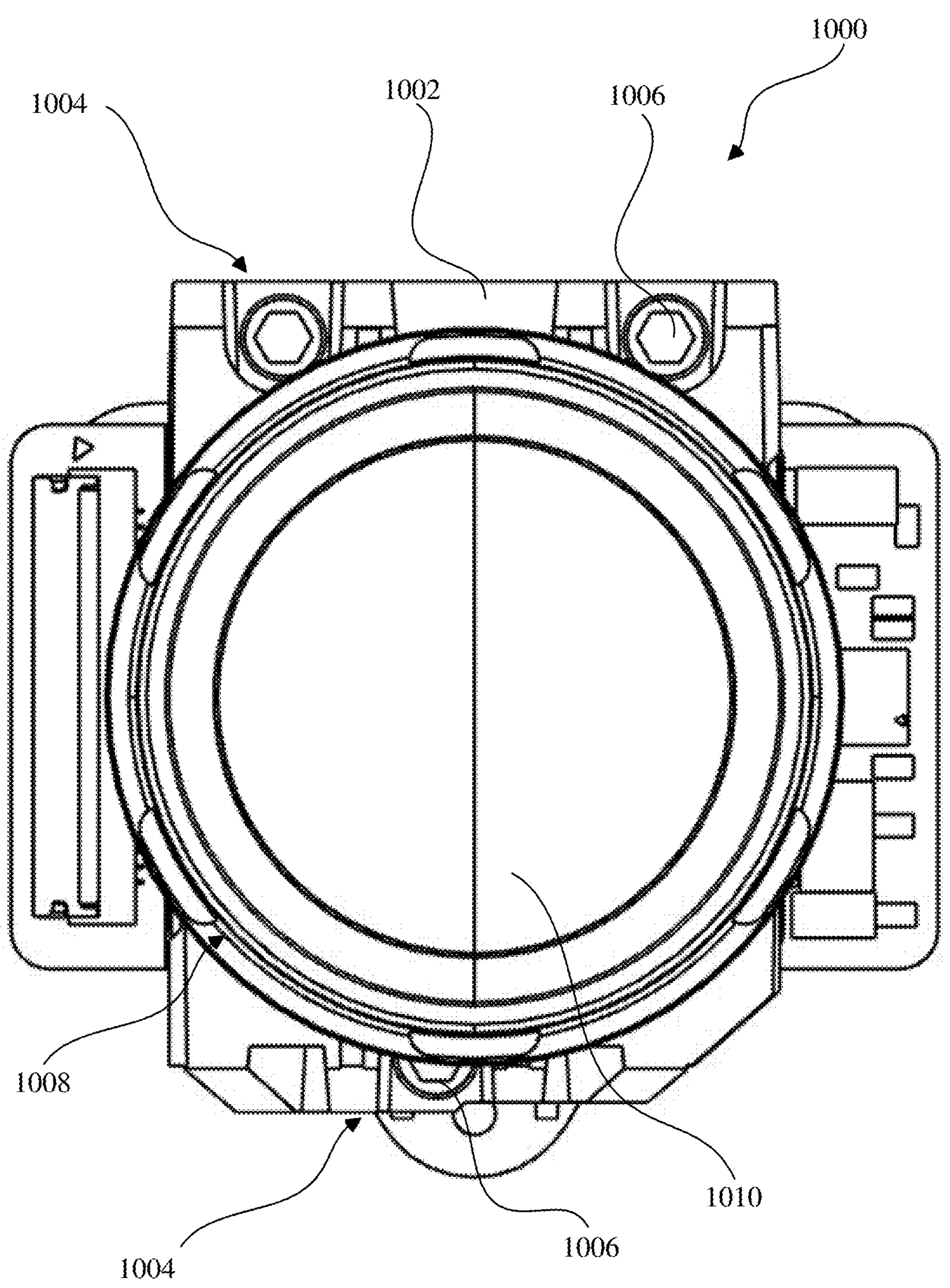
FIG. 10 is a front plan view of a second image sensor and lens assembly.

FIG. 10 is a rear plan view of the connector module 1000. The connector module 1000 has two parts with a rearward connector module 1002 being visible. The rearward connector module 1002 includes through holes 1004 that receive fasteners 1006. The through holes 1004 in the rearward connector module 1002 align with through holes in the forward connector module 908 (of FIG. 9) so that the rearward connector module 1002 and the forward connector module 908 are connected together. The through holes 1004 receive one or more fasteners 1006 that assist in forming the connector module 1000. The through holes 1004 receive fasteners 1006.

The fasteners 1006 function to form a connection, align along an optical axis, support the rearward connector module 1002, or a combination thereof. The fasteners 1006 may support the rearward connector module 1002 from the forward connector module 908 of FIG. 9. The fasteners 1006 may be a bolt, screw, clip, pin, tongue, post, or a combination thereof. The fasteners 1006 may extend parallel to the optical axis. The fasteners 1006 may support the rearward connector module so that an aperture 1008 within the rearward connector module 1002 is aligned along the optical axis 906 shown in FIG. 9.

The aperture 1008 functions to receive a rearward ISLA 1010, align the rearward ISLA 1010, support the rearward ISLA 1010, or a combination thereof. The aperture 1008 maybe an opening in the rearward connector module 1002 that receives all or a portion of the rearward ISLA 1010. The aperture 1008 may fixedly receive the rearward ISLA 1010. The aperture 1008 may include connection features (not shown). The connection features form a direct connection between the rearward connector module 1002 and the rearward ISLA 1010.

Figure 11A:
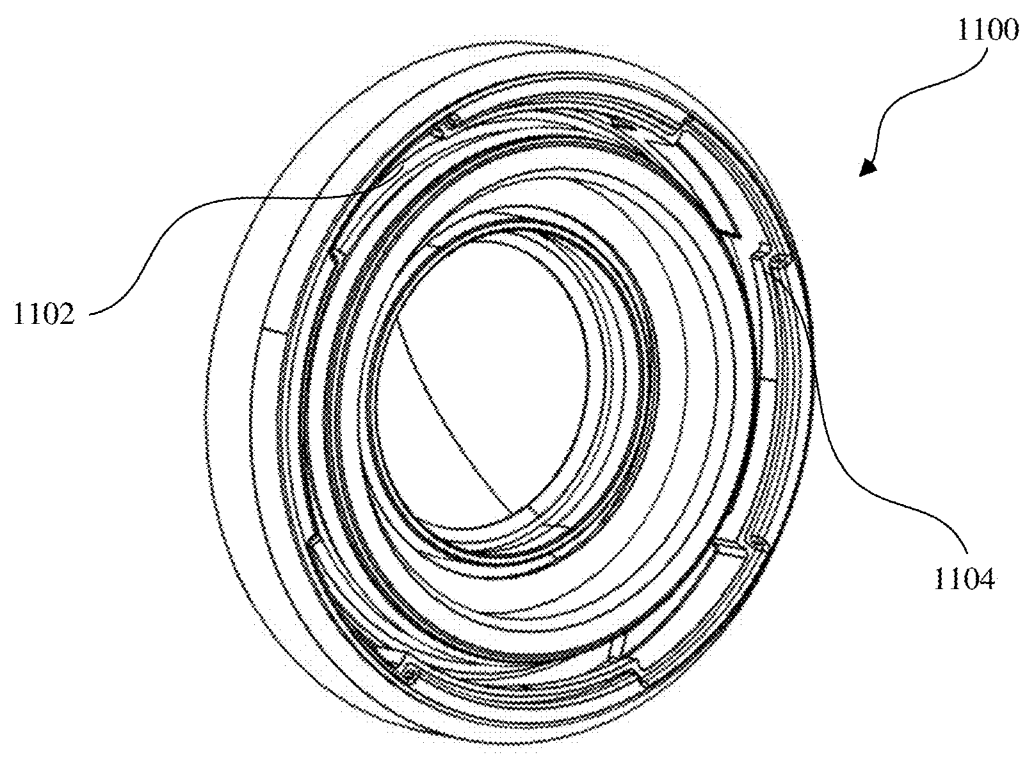
FIG. 11A is a rear isometric view of an outer lens.

FIG. 11A is a rear isometric view of an outer lens 1100. The outer lens 1100 is removable from the image capture apparatus 100, 200, 300, 400, 500, 600. The outer lens 1100 includes one or more seals 1102 located within the outer lens 1100.

The seals 1102 are movable and/or removable with the outer lens 1100. The seals 1102 may be any of the seals discussed herein. The seals 1102 may be an O-ring. The seals 1102 may be made of plastic, a polymer, rubber, an elastomer, or a combination thereof. The seals 1102 may be compressible. The seals 1102 may be located within connection devices 1104 of the outer lens 1100.

The connection devices 1104 may assist in connecting the outer lens 1100 to the image capture apparatus 100, 200, 300, 400, 500, 600. The connection devices 1104 may form a connection with the mounting structures 810 or 812 of FIG. 8A. The connection devices 1004 may form a connection by a twist and lock. The fasteners 1006 may be angled, stepped, ramped, changed in thickness, or a combination thereof. The connection devices 1104 may extend annularly around an interior of the outer lens 1100. The connection devices 1104 compress the seals 1102 when the connection devices 1104 connect the outer lens 1100 to the image capture apparatus 100, 200, 300, 400, 500, 600.

Figure 11B:
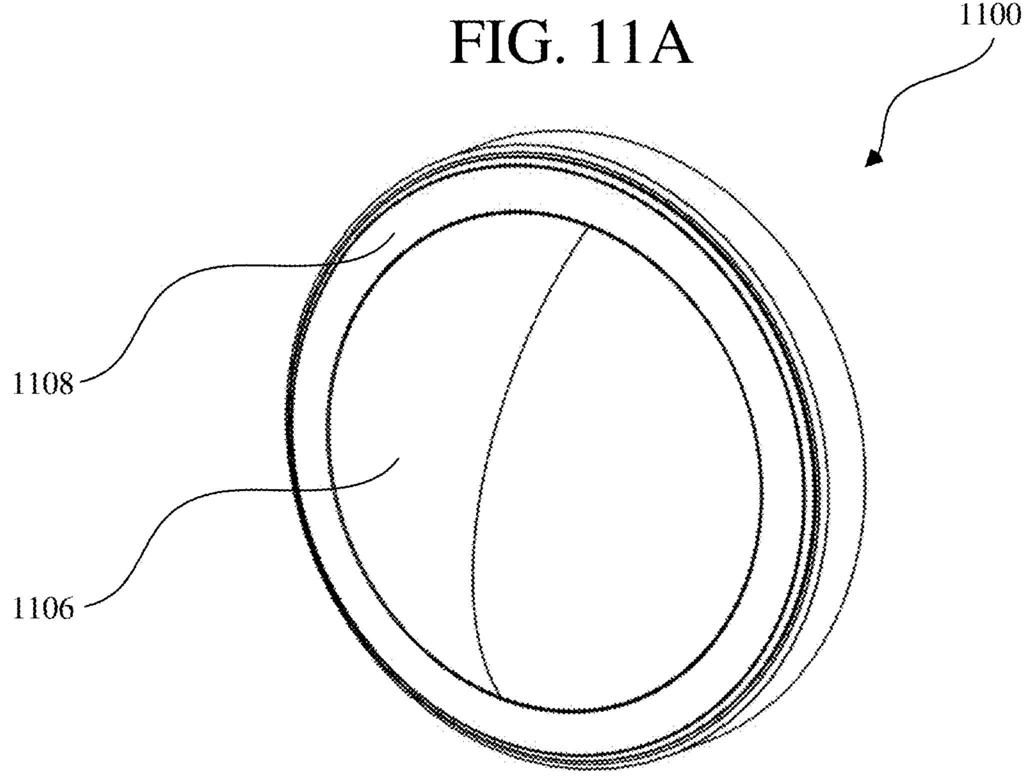
FIG. 11B is a front isometric view of an inner lens.

FIG. 11B is a front isometric view of the outer lens 1100 of FIG. 11A. The outer lens 1100 has a lens 1106 located within a lens housing 1108. The lens 1106 may protect an ISLA (e.g., forward ISLA 814 or rearward ISLA 816) The lens 1106 may direct light into an ISLA. The lens 1106 may form part of the optics of the image capture apparatus 100, 200, 300, 400, 500, 600. The lens 1106 may not change the optics of the image capture device when the lens 1106 is removed. The lens 1106 may be connected to a lens housing 1108.

The lens housing 1108 functions to support the lens 1106, connect the outer lens 1100 to an image capture device, or both. The lens housing 1108 may include the connection device 1104, the seal 1102, or both. The lens housing 1108 may be a rigid material that fixedly connects the outer lens 1100 to the image capture device. The lens housing 1108 may be made of or include metal, a polymer, plastic, stainless steel, plastic, a ferrous material, or a combination thereof.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture apparatus comprising:

a first image sensor and lens assembly (first ISLA);

a second image sensor and lens assembly (second ISLA);

a connector module that connects the first ISLA and the second ISLA in a back-to-back configuration, wherein the connector module is a forward connector module and a rearward connector module that are connected together, and the forward connector module houses all or a portion of the first ISLA and the rearward connector module houses all or a portion of the second ISLA;

a front connector connected to the connector module via fasteners that extend into the front connector and the connector module in a direction from the first ISLA towards the second ISLA so that the first ISLA and the second ISLA are connected within the image capture apparatus, wherein the rearward connector module is free of any connection within the image capture apparatus other than the connection with the forward connector module.

2. The image capture apparatus of claim 1, wherein the second ISLA is connected to the front connector via the connector module.

3. The image capture apparatus of claim 1, wherein a cantilevered connection is formed by the connector module so that the first ISLA and the second ISLA are supported only by the fasteners extending through the front connector.

4. The image capture apparatus of claim 1, wherein the first ISLA and the second ISLA are aligned along an optical axis.

5. The image capture apparatus of claim 1, further comprising:

one or more seals in communication with the connector module, the front connector, a rear connector, or a combination thereof that prevent fluids, debris, or both from entering into the image capture apparatus.

6. The image capture apparatus of claim 1, further comprising:

a housing that forms an exterior of the image capture apparatus, wherein the connector module, the front connector, or both extend through the housing to connect the connector module and the front connector directly together via the fasteners.

7. An image capture apparatus comprising:

a housing;

a first image sensor and lens assembly (first ISLA);

a front connector in communication with the first ISLA;

a second image sensor and lens assembly (second ISLA);

a connector module that connects the first ISLA and the second ISLA in a back-to-back configuration;

a rear connector;

a front seal located between the front connector and the connector module;

a rear seal located between the rear connector and the connector module;

a front removable outer lens connected to the front connector; and a rear removable outer lens connected to the rear connector, wherein the image capture apparatus is debris and/or waterproof when the front removable outer lens, the rear removable outer lens, or both are connected to the image capture apparatus, wherein the front connector is connected to the connector module by one or more fasteners, and wherein the image capture apparatus is debris and/or waterproof when the front removable outer lens, the rear removable outer lens, or both are removed.

8. The image capture apparatus of claim 7, further comprising:

fastener seals that extend around the one or more fasteners that connect the front connector to the connector module so that fluids and/or debris are prevented from extending around the one or more fasteners.

9. The image capture apparatus of claim 7, wherein the connector module includes a forward connector module that is in communication with the first ISLA and a rearward connector module that is in communication with the second ISLA.

10. The image capture apparatus of claim 9, wherein the forward connector module is connected to the front connector by fasteners.

11. The image capture apparatus of claim 9, wherein the rearward connector module is free of a direct connection with the rear connector.

12. The image capture apparatus of claim 7, wherein a front outer lens is connected to the front connector and a rear outer lens is connected to the rear connector.

13. An image capture apparatus comprising:

a connector module comprising:

a forward connector module comprising a forward aperture; and a rearward connector module comprising a rearward aperture;

a front image sensor and lens assembly (front ISLA) located within and connected to the forward aperture;

a rear image sensor and lens assembly (rear ISLA) located within and connected to the rearward aperture;

a front connector directly connected to the forward connector; and a forward lens mount seal located between the forward connector module and the front connector, wherein the rearward connector module is connected to the forward connector module and is free of any other connections to retain the rearward connector module within the image capture apparatus.

14. The image capture apparatus of claim 13, further comprising:

a rear connector located on a rearward side opposite the front connector, wherein the rearward connector module and the rear connector are free of any direct connection.

15. The image capture apparatus of claim 13, wherein the front ISLA and the rear ISLA are aligned along an optical axis.

16. The image capture apparatus of claim 13, wherein the forward connector module and the front connector are connected via one or more fasteners and a forward lens seal extends around the one or more fasteners to prevent fluids from passing around the one or more fasteners.

* * * * *